(12) United States Patent
Subramanian et al.

(10) Patent No.: US 8,227,320 B2
(45) Date of Patent: Jul. 24, 2012

(54) HIGH RELIABILITY SURVEILLANCE AND/OR IDENTIFICATION TAG/DEVICES AND METHODS OF MAKING AND USING THE SAME

(75) Inventors: Vivek Subramanian, Orinda, CA (US); Patrick Smith, San Jose, CA (US); Vikram Pavate, San Mateo, CA (US); Arvind Kamath, Mountain View, CA (US); Criswell Choi, Menlo Park, CA (US); Aditi Chandra, Los Gatos, CA (US); James Montague Cleeves, Redwood City, CA (US)

(73) Assignee: Kovio, Inc., San Jose, CA (US)

( * ) Notice: Subject to any disclaimer, the term of this patent is extended or adjusted under 35 U.S.C. 154(b) by 0 days.

(21) Appl. No.: 12/249,735

(22) Filed: Oct. 10, 2008

(65) Prior Publication Data
US 2009/0137071 A1 May 28, 2009

Related U.S. Application Data

(60) Provisional application No. 60/998,553, filed on Oct. 10, 2007, provisional application No. 60/998,554, filed on Oct. 10, 2007.

(51) Int. Cl.
*H01L 21/20* (2006.01)
(52) U.S. Cl. ...... 438/393; 257/532; 361/301.3; 361/301.4; 361/305
(58) Field of Classification Search ........ 340/572.8, 340/572.7; 361/301.4, 301.3, 305; 427/99.4, 427/99.2, 97.4; 257/532; 438/393
See application file for complete search history.

(56) References Cited

U.S. PATENT DOCUMENTS

| 6,400,271 | B1 | 6/2002 | Davies, Jr. et al. |
| 6,424,262 | B2 | 7/2002 | Garber et al. |
| 6,985,361 | B2* | 1/2006 | Credelle et al. ....... 361/736 |
| 7,113,131 | B2 | 9/2006 | Burke |
| 7,152,804 | B1* | 12/2006 | MacKenzie et al. ..... 235/492 |
| 7,387,260 | B1 | 6/2008 | MacKenzie et al. |
| 7,683,785 | B2* | 3/2010 | Johnson ............. 340/572.1 |
| 2002/0163434 | A1 | 11/2002 | Burke |
| 2003/0148024 | A1* | 8/2003 | Kodas et al. ........... 427/125 |
| 2004/0173873 | A1* | 9/2004 | Kumar et al. .......... 257/532 |
| 2005/0008880 | A1* | 1/2005 | Kunze et al. ........... 428/447 |

(Continued)

OTHER PUBLICATIONS

International Search Report and Written Opinion; International Application No. PCT/US2008/079657; Dated Jan. 2, 2009; 7 pages; International Searching Authority/United States, Alexandria, Virginia.

*Primary Examiner* — Ha Tran T Nguyen
*Assistant Examiner* — Aaron Dehne
(74) *Attorney, Agent, or Firm* — The Law Offices of Andrew D. Fortney, P.C.; Andrew D. Fortney; Ryan S. Dunning

(57) ABSTRACT

The present invention relates to methods of making capacitors for use in surveillance/identification tags or devices, and methods of using such surveillance/identification devices. The capacitors manufactured according to the methods of the present invention and used in the surveillance/identification devices described herein comprise printed conductive and dielectric layers. The methods and devices of the present invention improve the manufacturing tolerances associated with conventional metal-plastic-metal capacitor, as well as the deactivation reliability of the capacitor used in a surveillance/identification tag or device.

30 Claims, 6 Drawing Sheets

U.S. PATENT DOCUMENTS

| | | |
|---|---|---|
| 2005/0082636 A1* | 4/2005 | Yashima et al. ............. 257/532 |
| 2005/0194645 A1 | 9/2005 | Yamaguchi et al. |
| 2005/0198811 A1* | 9/2005 | Kurz et al. ..................... 29/601 |
| 2005/0214688 A1 | 9/2005 | Yamamoto et al. |
| 2006/0211187 A1 | 9/2006 | Choi et al. |
| 2007/0007342 A1 | 1/2007 | Cleeves et al. |
| 2008/0164563 A1* | 7/2008 | Nomura et al. ............... 257/532 |
| 2008/0174434 A1 | 7/2008 | Strauser et al. |

* cited by examiner

HIGH RELIABILITY SURVEILLANCE AND/OR IDENTIFICATION TAG/DEVICES AND METHODS OF MAKING AND USING THE SAME

RELATED APPLICATIONS

This application claims the benefit of U.S. Provisional Application No. 60/998,553, filed Oct. 10, 2007, which is incorporated herein by reference in its entirety, and U.S. Provisional Application No. 60/998,554, filed Oct. 10, 2007. Furthermore, this application may be related to U.S. Pat. No. 7,286,053 and co-pending U.S. patent application Ser. No. 11/243,460, filed Oct. 3, 2005, the relevant portions of which are incorporated herein by reference.

FIELD OF THE INVENTION

The present invention generally relates to the field of surveillance and/or identification tags and devices. More specifically, embodiments of the present invention pertain to EAS, RF and/or RFID tags/devices, structures and methods for their manufacturing and/or production, and methods of using such tags and/or devices.

SUMMARY OF THE INVENTION

Embodiments of the present invention relate to surveillance/identification tags and devices, the structures comprising such devices, and methods of manufacturing and using the same. More specifically, embodiments of the present invention pertain to EAS, RF and/or RFID devices, structures thereof, and methods for their manufacture and use.

A first aspect of the present invention concerns methods of making capacitors and/or surveillance/identification devices. In one general method, a capacitor can be made by forming a dielectric layer on an electrically conductive substrate, and then printing a (semi)conductive layer on at least a portion of the printed dielectric layer. The dielectric layer is then etched using the (semi)conductive layer as a mask to form a capacitor dielectric on the electrically conductive substrate. A second dielectric layer is then formed in a pattern on the conductive substrate and/or the (semi)conductor layer (e.g., the top capacitor electrode). An electrically conducting "feature" is then formed on the second dielectric layer. A first portion of the feature is in contact with the (semi)conductive layer (e.g., top capacitor electrode) and a second portion of the conducting feature is in contact with the conductive substrate. A bottom capacitor electrode is then formed from the conductive substrate. In various embodiments, an inductor and/or antenna may be formed from the conductive substrate to manufacture a surveillance/identification device.

In a second general embodiment, a capacitor can be made by printing a first (semi)conductive layer, including a bottom capacitor electrode on a substrate, forming a first dielectric layer in a pattern on the first (semi)conductive layer, and printing a top/upper capacitor electrode/plate on the first dielectric layer. A second dielectric layer is formed on the substrate. The second dielectric layer has a first contact hole therein exposing the first (semi)conductive layer, and a second contact hole exposing the top/upper capacitor electrode. A surveillance/identification device may be made using this capacitor by coupling and/or connecting an antenna and/or inductor to the first (semi)conductive layer and the top capacitor electrode.

A second aspect of the present invention concerns surveillance and/or identification devices, such as EAS, RF, and/or RFID devices or tags. According to one general embodiment, the surveillance and/or identification device generally comprises (a) a unitary conductive structure comprising a bottom capacitor electrode and an inductor, (b) a first dielectric layer on the bottom capacitor electrode and inductor, (c) a top capacitor electrode having a dome-shaped profile on the first dielectric layer, (d) a second dielectric layer on the top capacitor electrode, and the conductive structure, and (e) an electrically conducting feature on the second dielectric, having one portion contacting the top capacitor electrode and a second portion contacting the conductive structure.

According to a second general embodiment, a surveillance and/or identification device comprises (a) a bottom capacitor electrode having a dome-shaped profile on a substrate, (b) a first dielectric layer on the bottom capacitor electrode, (c) top capacitor electrode having a dome-shaped profile on the first dielectric layer, (d) a second dielectric layer on the substrate having first and second contact holes therein to expose the bottom capacitor electrode and the top capacitor electrode, and (e) and antenna and/or inductor having a first end coupled to the bottom capacitor electrode and a second end coupled to the top capacitor electrode.

A third aspect of the present invention concerns a method of detecting items with the surveillance and/or identification devices of the present invention. In general a surveillance/identification device can be detected by causing or inducing a current sufficient for the device to radiate, reflect, or backscatter detectable electromagnetic radiation and detecting the detectable electromagnetic radiation. Optionally, a device that is detected can be selectively deactivated, or in the alternative, a detected device may be instructed to perform an action.

The present invention solves known problems associated with conventional surveillance and/or identification devices including (1) unreliable breakdown of the capacitor dielectric due to large manufacturing tolerances associated with the thickness and quality of the capacitor dielectric used in conventional surveillance/identification devices (e.g., plastic dielectric), and (2) recovery of the device due to a reformation of "healing" of the capacitor dielectric layer after it has broken down in the deactivation process. Using a capacitor formed with a printed metal-oxide-semiconductor device and/or using thin film materials as described herein, ensures improved manufacturing tolerances, and also ensures that the healing problems associated with conventional capacitors are eliminated or dramatically reduced. These and other advantages of the present invention will become readily apparent from the detailed description of preferred embodiments below.

DETAILED DESCRIPTION OF THE PREFERRED EMBODIMENTS

Figure 1A:
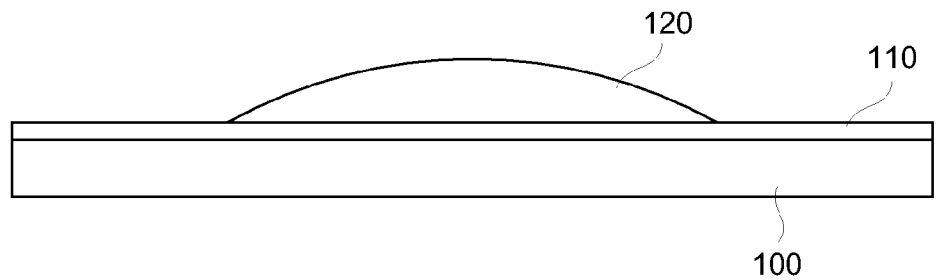
FIGS. 1A and 1B show cross-sectional and top views, respectively, of a conductive substrate having a dielectric layer and (semi)conductive layer printed thereon.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention. In addition, it should be understood that the possible permutations and combinations described herein are not meant to limit the invention. Specifically, variations that are not inconsistent may be mixed and matched as desired.

For the sake of convenience and simplicity, the terms "coupled to," "connected to," and "in communication with" mean direct or indirect coupling, connection or communication unless the context indicates otherwise. These terms are generally used interchangeably herein, but are generally given their art-recognized meanings. Also, for convenience and simplicity, the terms "surveillance," "EAS," "wireless," "RF," "RFID," and "identification" may be used interchangeably with respect to intended uses and/or functions of a device and/or tag, and the term "EAS tag" or "EAS device" may be used herein to refer to any EAS and/or surveillance tag and/or device. In addition, the terms "item," "object" and "article" are used interchangeably, and wherever one such term is used, it also encompasses the other terms. Furthermore, the terms "capacitor electrode" and "capacitor plate" may be used interchangeably, and also the terms "shape," "feature," "line," and "pattern" may be used interchangeably. The term "(semi) conductor," "(semi)conductive" and grammatical equivalents thereof refer to materials, precursors, layers, features or other species or structures that are conductive and/or semiconductive.

In the present application, the term "deposit" (and grammatical variations thereof) is intended to encompass all forms of deposition, including blanket deposition (e.g., CVD and PVD), (spin)coating, and printing. In various embodiments of the method of printing a metal-containing ink on a substrate, printing may comprise inkjetting, gravure printing, offset printing, flexographic printing, spray-coating, slit coating, extrusion coating, meniscus coating, microspotting and/or pen-coating the metal formulation onto the substrate. Also, for convenience and simplicity, the terms "part," "portion," and "region" may be used interchangeably but these terms are also generally given their art-recognized meanings. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use. In addition, the term "doped" refers to a material that is doped with any substantially controllable dose of any dopant (e.g., lightly doped, heavily doped, or doped at any doping level in between).

In the present disclosure, the phrase "consisting essentially of a Group IVA element" does not exclude intentionally added dopants, which may give the Group IVA element certain desired (and potentially quite different) electrical properties. The term "(poly)silane" refers to compounds or mixtures of compounds that consist essentially of (1) silicon and/or germanium and (2) hydrogen, and that predominantly contain species having at least 15 silicon and/or germanium atoms. Such species may contain one or more cyclic rings. The term "(cyclo)silane" refers to compounds or mixtures of compounds that consist essentially of (1) silicon and/or germanium and (2) hydrogen, and that may contain one or more cyclic rings and less than 15 silicon and/or germanium atoms. In a preferred embodiment the silane has a formula $Si_xH_y$, where x is from 3 to about 200, and y is from x to (2x+2), where x may be derived from an average number molecular weight of the silane. The term "hetero(cyclo)silane" refers to compounds or mixtures of compounds that consist essentially of (1) silicon and/or germanium, (2) hydrogen, and (3) dopant atoms such as B, P, As or Sb that may be substituted by a conventional hydrocarbon, silane or germane substituent and that may contain one or more cyclic rings. Also, a "major surface" of a structure or feature is a surface defined at least in part by the largest axis of the structure or feature (e.g., if the structure is round and has a radius greater than its thickness, the radial surface[s] is/are the major surface of the structure).

One embodiment of the present invention concerns a method of making a capacitor and/or surveillance/identification device comprising the steps of (a) forming a first dielectric layer on a conductive substrate, (b) printing a (semi) conductive layer on at least a portion of the first dielectric layer, (c) etching the first dielectric layer using the (semi) conductive layer as a mask, (d) forming a second dielectric layer in a pattern on the conductive substrate and/or the (semi) conductive layer, (e) forming an electrically conducting feature on the second dielectric layer, one portion of the electrically conducting feature contacting the (semi)conductive layer and a second portion of the conducting feature contacting the conductive substrate, (f) forming a bottom capacitor electrode from the conductive substrate, and if making a surveillance/identification device (g) forming an inductor from the conductive substrate.

A second embodiment of the present invention concerns a second method of making a capacitor and/or surveillance/identification device comprising the steps of (a) printing a first (semi)conductive layer, including a bottom capacitor electrode on a substrate, (b) forming a first dielectric layer in a pattern on the first (semi)conductive layer, (c) printing a top capacitor electrode on the first dielectric layer, (d) forming a second dielectric layer on the substrate, the second dielectric layer having a first contact hole therein exposing the first (semi)conductive layer and a second contact hole exposing the top capacitor electrode, and if making a surveillance/identification device (e) coupling and/or connecting an antenna and/or inductor to the first (semi)conductive layer and the upper capacitor plate.

In a further embodiment, the present invention concerns a surveillance and/or identification device comprising (a) a unitary conductive structure comprising a bottom capacitor electrode and an inductor, (b) a first dielectric layer on the bottom capacitor electrode and inductor, (c) a top capacitor electrode having a dome-shaped profile on the first dielectric layer, (d) a second dielectric layer on the top capacitor electrode and the conductive structure, and (e) an electrically conducting feature on the second dielectric, having one portion contacting the top capacitor electrode and a second portion contacting the conductive structure.

In an alternative embodiment, a surveillance and/or identification device may comprise (a) a bottom capacitor electrode having a dome-shaped profile on a substrate, (b) a first dielectric layer on the bottom capacitor electrode, (c) top capacitor electrode having a dome-shaped profile on the first dielectric layer, (d) a second dielectric layer on the substrate having first and second contact holes therein to expose the bottom capacitor electrode and the top capacitor electrode, and (e) an antenna and/or inductor having a first end coupled to the bottom capacitor electrode and a second end coupled to the top capacitor electrode.

In a further aspect, the present invention concerns a method of detecting an item or object, generally comprising the steps of (a) causing or inducing a current in a surveillance and/or identification device affixed to or associated with the item or object, sufficient for the device to radiate detectable electromagnetic radiation; (b) detecting the detectable electromagnetic radiation; and optionally, (c) selectively deactivating the device or causing the device to perform an action.

The invention, in its various aspects, will be explained in greater detail below with regard to exemplary embodiments.

Exemplary Methods of Making a Capacitor and/or a Surveillance/Identification Device In one exemplary implementation, the method for making a capacitor comprises the steps of: (a) forming a first dielectric layer on a conductive (e.g., electrically functional) substrate; (b) printing a (semi)conductive layer on at least a portion of the first dielectric layer; (c) etching the dielectric layer using the (semi)conductive layer as a mask; (d) forming a second dielectric layer in a pattern on the conductive substrate and/or the (semi)conductive layer; (e) forming an electrically conducting feature (e.g., pattern, line, shape, etc.) on the second dielectric layer, one portion of the electrically conducting feature contacting the (semi)conductive layer and a second portion of the conducting feature contacting the conductive substrate; and (f) if necessary or desired, forming a bottom capacitor electrode from the conductive substrate. An exemplary surveillance/identification tag and/or device can be made by further forming an inductor from the conductive substrate or from the electrically conducting "feature." The capacitor may be either linear or non-linear. In preferred embodiments, an EAS, RF, or RFID tag/device is formed according to the above-described method(s).

In a preferred embodiment, the (semi)conductive layer (e.g., the top capacitor electrode) is formed by printing a liquid-phase (e.g., Group IVA element precursor) ink on the dielectric layer. Printing an ink, as opposed to blanket deposition, photolithography and etching, saves on the number of processing steps, the length of time for the manufacturing process, and/or on the cost of materials used to manufacture the capacitor and/or surveillance/identification device.

The first exemplary method for manufacturing the present capacitor and/or surveillance/identification device is described in detail below with reference to FIGS. 1A-6B.

The Substrate

Figure 1B:
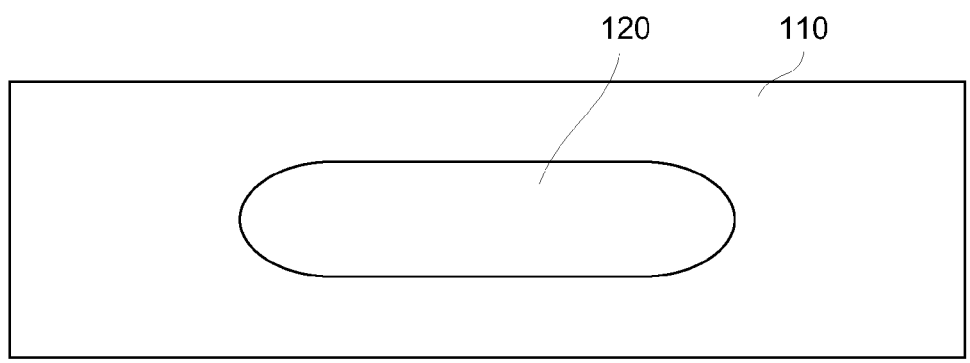

FIGS. 1A-1B respectively show cross-sectional and top-down views of a conductive (e.g., electrically functional) substrate 100 having a dielectric layer 110 and (semi)conductive layer 120 formed thereon. In various embodiments, the conductive substrate comprises a metallic substrate, metal film, metal foil, or metal sheet. Specifically, the metal substrate may comprise aluminum, titanium, copper, silver, chromium, molybdenum, tungsten, nickel, gold, palladium, platinum, zinc, iron, steel (e.g., stainless steel) or any alloy thereof. Other suitable conductive materials are described below with regard to exemplary surveillance/identification devices (see, e.g., the bottom capacitor electrode).

For some implementations, the metal for the conductive substrate may be chosen at least in part based on its ability to be anodized into an effective dielectric. In exemplary embodiments, the conductive substrate may have a nominal thickness of from 5-200 µm (preferably 20-100 µm) and/or a resistivity of 0.1-10 µohm-cm (preferably 0.5-5 µohm-cm).

Prior to subsequent processing, the conductive substrate 100 may be conventionally cleaned and smoothed. This surface preparation may be achieved by chemical polishing, electropolishing and/or oxide stripping to reduce surface roughness and remove low quality native oxides. A description of such processes is given in, "The Surface Treatment and Finishing of Aluminum and Its Alloys," by P. G. Sheasby and R. Pinner, sixth edition, ASM International, 2001, the relevant portions of which are incorporated herein by reference.

Forming the First Dielectric Layer/Film

As shown in FIGS. 1A-1B, the method further comprises forming a first dielectric layer 110 on the conductive substrate 100. The first dielectric layer may be formed by oxidizing and/or nitriding the conductive substrate (or a liquid oxide/nitride precursor formed thereon), in an oxidizing and/or nitriding atmosphere. For example, the dielectric can be formed by oxidizing a liquid silane printed onto a metal substrate (e.g., steel), or by coating the substrate with another conductive material that can be oxidized or nitrided (e.g., silicon, aluminum, chromium, hafnium etc.). In the alternative, the dielectric may be formed by depositing (e.g., by printing liquid phase or chemical bath deposition processes) a dielectric precursor material (e.g., a $SiO_2$ precursor such as tetraalkylsiloxane or tetraalkoxysilane) and subsequently converting the precursor to a dielectric film (e.g., by drying, curing, and/or annealing). However, if the conductive substrate is one that cannot be processed at high temperatures (e.g., aluminum), methods such as printing or vapor deposition are preferred. After converting the precursor material to a dielectric film, additional metal oxides (e.g., $TiO_2$, $ZrO_2$, $HfO_2$, etc.) may be deposited on the film. Thus, in various embodiments, the dielectric may comprise a plurality of layers.

In other embodiments, the dielectric may be coated/deposited by blanket deposition techniques. In general, coating refers to a process where substantially the entire surface of a substrate is covered with the formulation. Coating may comprise methods such as spray coating, dip coating, blade coating, meniscus coating, slit coating, extrusion coating, pen-coating, microspotting, inkjetting, gravure printing, flexographic printing, or spin-coating. In such embodiments, areas of the substrate may be patterned and/or exposed as desired by etching techniques known in the art.

In some embodiments, the first dielectric layer can be deposited by vacuum deposition methods (e.g., CVD, PECVD, LPCVD, sputter deposition, etc.). Another method of forming the dielectric employs anodization to form a MOS dielectric and/or a deactivation dielectric. A detailed description of forming the dielectric by anodization is found in U.S. Pat. No. 7,286,053, the relevant portions of which are incorporated herein by reference.

Figure 2:
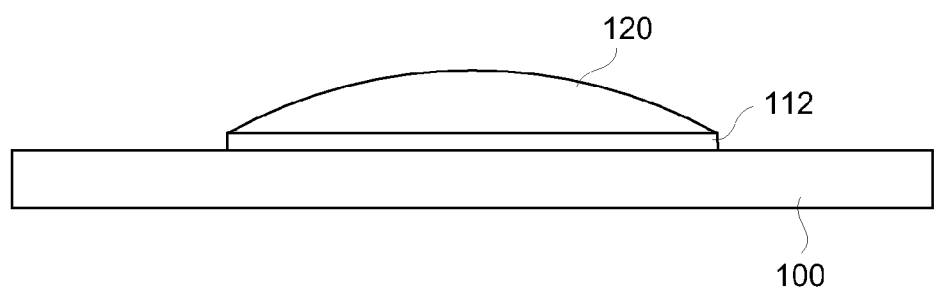
FIG. 2 shows a cross-sectional view of the structure of FIGS. 1A and 1B with the dielectric layer etched using the (semi)conductive layer as a mask.

In some implementations, the dielectric (or suitable dielectric precursor) can be printed onto the conductive substrate. During the printing process, a liquid-based composition (e.g., a solution, suspension, emulsion, etc.) is selectively deposited in a predetermined pattern, and with a characteristic resolution (e.g., minimum layout dimension, spacing, alignment margin of error, or any combination thereof). Suitable printing processes may include inkjet printing, gravure printing, screen printing, offset printing, flexography, syringe dispensing, microspotting, stenciling, stamping, pump dispensing, laser forward transfer, local laser CVD and/or pen-coating. Preferably, the dielectric is printed by inkjet printing. For example, materials such as spin-on-glasses, and/or boron nitride can be printed on the conductive substrate. The dielectric layer may be printed such that areas of the conductive substrate are exposed. In the alternative, the dielectric layer may be printed to cover the entire substrate, and then etched using subsequently formed structures as a mask, as illustrated in FIG. 2.

The dielectric layer may comprise any suitable electrically insulating dielectric material. Exemplary dielectric materials are discussed below with regard to exemplary surveillance devices (see, e.g., the sections herein entitled, "The First and Second Dielectric Layers"). For example, the dielectric insulator of the capacitor may comprise or consist essentially of an organic or an inorganic insulator. In preferred embodiments, the dielectric comprises an oxide and/or nitride of the metal of the conductive/metallic substrate. In various embodiments, the dielectric layer (e.g., structure 110 of FIGS. 1A and 1B) is formed having a thickness of from 50 to 500 Å and/or a breakdown voltage of from about 5 V to less than 50 V, preferably from 10 V to 20 V. However, the dielectric thickness may be adjusted as needed to control capacitance, and to control the voltage at which the dielectric is intended to rupture.

Forming the (Semi)Conductive Layer

As shown in FIGS. 1A and 1B, the method further comprises the step of depositing a (semi)conductive layer (i.e., top capacitor electrode) 120 on the first dielectric layer 110. The (semi)conductive layer may be formed by depositing a metal and/or a semiconductor layer (e.g., lightly doped, heavily doped, or undoped) on the dielectric. In general, any method for depositing the metal and/or semiconductor material may be used, such as printing, or conventional blanket deposition (e.g., by chemical vapor deposition [CVD], low pressure CVD, sputtering, electroplating, spin coating, spray coating, etc.), photolithography and etching. However, printing is preferred.

According to the present method(s), printing may comprise inkjet printing, gravure printing, screen printing, offset printing, flexography, syringe dispensing, microspotting, stenciling, stamping, pump dispensing, laser forward transfer, local laser CVD and/or pen-coating. Printing allows for greater control of the thickness of the printed metal/(semi)conductive layer. For example, if a thicker (semi)conductive layer is desired, the number of drops, the drop volume, or the ink volume can be increased. A thicker metal layer may also be achieved by decreasing the pitch between drops in an area wherein a thicker (semi)conductive layer (e.g., having lower resistance) is desired. Furthermore, printing processes allow the contact angle of the printed ink to be varied locally. To illustrate, a preprinting step adapted to locally vary the surface energy of the substrate can be performed so that different metal heights/thicknesses and/or line widths can be achieved with a single printing step.

In exemplary embodiments, a metal-containing ink is deposited on the dielectric by coating or printing techniques. In various implementations, the metal is blanket deposited by spin-coating an ink (e.g., a metal precursor ink) containing the metal-containing material (e.g., metal, organometallic precursor(s), and/or metal nanoparticles), and subsequently curing or annealing the metal. In preferred embodiments, the metal ink is selectively deposited by printing an ink comprising a precursor of a desired metal (e.g., a silicide-forming metal) in a solvent, and subsequently curing, drying, and/or annealing the metal.

The metal-containing ink may comprise or consist essentially of the metal precursor (e.g., metal-containing material) in an amount of from 1 to 50 wt. % of the ink (or any range of values therein), and a solvent in which the metal-containing material is soluble. Such metal-containing inks/precursors, as well as exemplary metals and/or other metal-containing ink formulations, are discussed in greater detail below with regard to exemplary surveillance/identification devices. Furthermore, metal-containing inks, and methods of forming conductive structures/layers (e.g., semiconductor layers) from such inks are described in co-pending U.S. patent application Ser. Nos. 10/616,147, 10/949,013, 11/246,014, 11/249,167, 11/452,108, 11/888,949, 11/867,587, 12/131,002, and 12/175,450, respectively filed on Jul. 8, 2003, Sep. 24, 2004, Oct. 6, 2005, Oct. 11, 2005, Jun. 12, 2006, Aug. 3, 2007, Oct. 4, 2007, May 30, 2008, and Jul. 17, 2008, the relevant portions of each of which are incorporated herein by reference.

In some embodiments, the (semi)conductive layer may be printed as a mixture of two or more metal precursors, or alternatively, of one or more metal precursors, and one or more semiconductor precursors. In other embodiments, two or more metal inks may be successively printed and dried as laminated layers. The mixtures and/or laminates can be optionally heated or otherwise reacted during or after formation to form the (semi)conductive layer.

The printed metal-containing/precursor ink may be dried by heating the substrate at a temperature and for a length of time sufficient to remove any solvent in the ink. Temperatures for removing solvents range from about 80° C. to about 150° C., or any range of temperatures therein (e.g., from about 100° C. to about 120° C.). The lengths of time for removing solvents from a printed ink within these temperature ranges are from about 1 second to about 10 minutes, 10 seconds to about 5 minutes, or any range of times therein (e.g., from about 30 seconds to about 5 minutes, or about 1 minute to 3 minutes, etc.). Heating may take place on a conventional hotplate or in a conventional furnace or oven. Optionally, the heating may occur in an inert atmosphere as described in co-pending U.S. application Ser. No. 11/888,949, filed Aug. 3, 2007, the relevant portions of which are incorporated herein by reference.

After the metal-containing ink has been dried to remove the solvent, the remaining material may be subject to an annealing process at a temperature and for a length of time sufficient to obtain desired electrical and/or physical properties, as well as proper adhesion to the underlying dielectric layer. Annealing temperatures range from about 100° C. to about 300° C., or any range of temperatures therein (e.g., from about 150° C. to about 250° C.). The annealing time generally ranges from about 1 minute to about 2 hours. In preferred embodiments, the metal-containing film is annealed from about 10 minutes to about 1 hour (or any range of this therein, e.g., from about 10 to about 30 minutes).

In various embodiments, annealing occurs in a furnace or oven, and optionally in an inert or reducing atmosphere. For example, the metal-containing precursor film may be exposed to a reducing agent, and heated at a temperature ranging from greater than ambient temperature to about 200-400° C., depending on the substrate. This process has particular advantages in embodiments where the substrate cannot be processed at a relatively high temperature (e.g., aluminum foil, a polycarbonate, polyethylene and polypropylene esters, a polyimide, etc.). A sealable oven, furnace, or rapid thermal annealing furnace configured with a vacuum source and reducing/inert gas sources may be used for providing the reducing atmosphere and heat (thermal energy) for heterogeneous reduction. In the alternative, the metal precursor film may be thermally decomposed to the elemental metal using a heat source (e.g., a hotplate) in an apparatus in which the atmosphere may be carefully controlled (e.g., a glove box or dry box). Such annealing/reducing processes and alternatives thereof are described in co-pending U.S. application Ser. Nos. 11/888,949 and 12/131,002, respectively filed Aug. 3, 2007 and May 30, 2008, the relevant portions of which are incorporated by reference herein.

In some implementations, the (semi)conductive layer may comprise a semiconductor layer/component formed at a thickness of from 50 to 200 nm. In such embodiments, the semiconductor layer may comprise one or more (doped) Group IVA elements (e.g., silicon and/or germanium), a "III-V" material (e.g., GaAs), and/or an organic or polymeric semiconductor. For example, depositing the semiconductor material or semiconductor material precursor might comprise depositing a liquid-phase Group IVA element precursor ink on the dielectric film. Suitable liquid-phase Group IVA element precursor inks and methods for printing such inks are disclosed in co-pending U.S. application Ser. Nos. 10/616,147, 10/789,317, and 11/867,587, respectively filed Jul. 8, 2003, Feb. 27, 2004, and Oct. 4, 2007, the relevant portions of each of which are incorporated herein by reference.

In some embodiments, the (semi)conductive layer may be formed by electro(less) plating processes. In these embodiments, printed metal layer (e.g., Pd) can serve as a seed layer for electroless deposition or electroplating of other metals (e.g., Ag, Cu, Ni, etc.) and/or forming a metal silicide if so desired. A conductive metal (e.g., bulk conductive metal) may be plated onto the metal seed layer and/or onto a metal silicide. The resulting structure can be subsequently annealed to improve the electrical contact between the silicide and the plated metal. A cleaning and/or surface roughening step may be applied to the dielectric layer, and/or the dielectric layer may be etched before printing the metal ink to improve the adhesion of the plated metal to the dielectric layer. Plating the conductive metal may comprise either electroless plating or electroplating. The conductive metal may comprise Al, Ag, Au, Cu, Pd, Pt, Ni, Cr, Mo, W, Ru, Rh, and alloys and/or mixtures thereof. Optionally, the bulk conductive metal may be further annealed to improve one or more physical and/or electrical characteristics.

It is generally desirable to increase the frequency response of the capacitor (e.g., MOS capacitor circuit) used in a surveillance/identification device, and provide a low series resistance for the circuitry in the device. This enables high frequency operation (e.g., in the range of 125 KHz and above, including, for example, 8.2 MHz or 13.56 MHz). To achieve sufficiently low series resistance and/or increased frequency response, the material used to form the (semi)conductive layer (e.g., semiconductor component/layer) can be recrystallized. The recrystallization process may improve the carrier mobility and/or dopant activation of the conductive layer/semiconductor component. Mobilities approaching 10 $cm^2$/vs and higher may be required for low dissipation and/or effective high Q. Low dissipation generally requires low series resistance, preferably less than 5 Ohms for the entire circuit, along with a large parallel resistance (generally provided by a low leakage dielectric) of at least $10^4$ Ohms, preferably $\geqq 10^5$ Ohms, most preferably $>10^6$ Ohms. Effective high Q provides low field and/or high read range operation in MHz range frequencies and higher. Preferred techniques for recrystallization are described in U.S. Pat. No. 7,286,053, issued Oct. 23, 2007, the relevant portions of which are incorporated by reference herein.

Various embodiments of the present method may comprise forming the (semi)conductive layer/top capacitor plate by printing a doped semiconductor layer (e.g., lightly or heavily doped). Heavily doping, or alternatively, siliciding the semiconductor material may also increase the frequency response of the EAS tag MOS capacitor circuit, and decrease series resistance. A doped semiconductor layer may be formed by conventionally implanting a conventional semiconductor dopant, diffusing the dopant into the semiconductor material from a solid or vapor dopant source, by printing a doped semiconductor or semiconductor precursor such as a B- or P-containing (cyclo)silane (see co-pending U.S. application Ser. Nos. 10/616,147 and 10/789,317, respectively filed Jul. 8, 2003 and Feb. 27, 2004, the relevant portions of each of which are incorporated herein by reference), and/or by laser forward transfer of a doped semiconductor layer or dopant diffusion source layer.

In some instances, it may be desirable to provide a relatively low level of doping (a concentration of $<5 \times 10^{18}$ $cm^{-3}$ electrically active dopant atoms) in the bulk of the active semiconductor layer 30 to control the CV slope of the surveillance/identification device, and also reduce the series resistance of the semiconductor component, thereby allowing higher Q and/or higher frequency operation (see U.S. Pat. No. 7,286,053, issued Oct. 23, 2007, the relevant portion of which is incorporated herein by reference).

Additional formulations and/or methods of forming (semi)conductive layers are discussed below with regard to the second exemplary method of forming a capacitor and/or surveillance/identification device. The formulations and techniques described below are applicable to forming the (semi)conductive layer herein to the extent that they are not contradictory.

Forming the Second Dielectric Layer

Figure 3A:
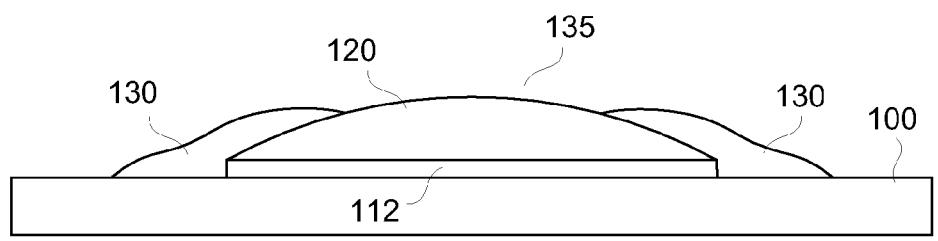
FIGS. 3A and 3B show cross-sectional and top views, respectively, of the structure of FIG. 2 with a second dielectric layer on the (semi)conductive layer.
Figure 3B:
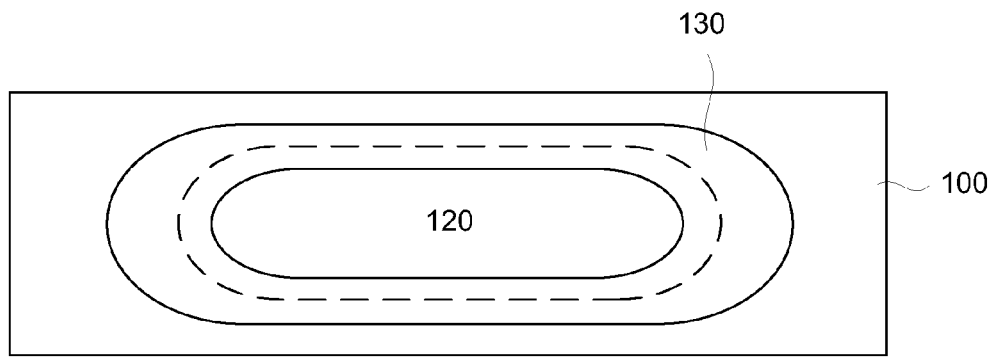

Referring now to FIGS. 3A-3B (which respectively show cross-sectional and top-down views of a capacitor formed according to the present exemplary method), the present method of manufacturing a capacitor and/or a surveillance and/or identification device may further comprise the step of depositing/forming a second dielectric (e.g., an interlayer dielectric) 130 on at least a portion of the (semi)conductive layer. As show in FIG. 3A, the second dielectric layer may also be formed on portions of the conductive substrate. In general, the second dielectric layer is formed in a desired pattern. The second dielectric layer provides an electrical separation (e.g., in terms of leakage and capacitance) between a subsequently formed inductor and a subsequently formed electrically conducting feature. The second dielectric layer may be formed according to any suitable method known in the art.

For example, in one embodiment, the second dielectric layer 130 is blanket deposited over the entire device and selected portions thereof removed (e.g., by conventional photolithography and etching) to form a plurality of contact holes (e.g., 135 of FIGS. 3A-3B) in the second dielectric layer 130 that is sufficient to expose at least a portion of the conductor layer/top capacitor electrode 120 and/or portions of the conductive substrate 100. Blanket deposition of the second dielectric layer 130 may be done by extrusion, blade, dip, linear, spin or other coating technique, or in the alternative, by local deposition techniques such as printing or dispensing. In the case of printing or dispensing, this may also serve the purpose of patterning the second dielectric layer. Patterning of the second dielectric layer may be done by direct printing of the dielectric precursor materials (e.g., by inkjet printing, screen, gravure, flexography, laser forward transfer, etc.) or indirect patterning (such as with a photo- and/or thermo-patternable precursor material that is exposed by a photomask, thermal or laser pattern and developed, or extrinsically via a patterning process such as conventional photolithography, embossing or similar technique). In some implementations, the etching process may comprise laser ablation, mechanical penetration or other etching or dielectric removal techniques known in the art.

In alternate embodiments, the second dielectric layer is selectively deposited on one or more predetermined portions of the structure to form a desired pattern, including but not limited to the (semi)conductive layer and the conductive substrate. In preferred embodiments, selective deposition may be accomplished using any of the various printing processes and/or techniques discussed herein. Specifically, in some implementations, the second dielectric layer 130 may be formed by (i) printing a liquid-phase dielectric precursor ink on at least predetermined portions of the (semi)conductive layer 120 (and optionally the conductive substrate 100), and (ii) drying and/or curing the dielectric precursor/ink to form the second dielectric layer 130. As previously stated, the liquid-phase dielectric precursor ink may be selectively printed on the structure such that contact holes (e.g., 135 of FIGS. 3A-3B) are formed to expose a portion of the (semi)conductive layer/top capacitor electrode and/or the conductive substrate.

The liquid-phase dielectric precursor ink used in printing and/or coating processes may comprise a compound of the formula $A_nH_y$, where n is from 3 to 12, each A is independently Si or Ge, and y is an even integer of from n to 2n+2, and preferably a compound of the formula $(AH_z)_n$, where n is from 5 to 10, each A is independently Si or Ge, and each of the n instances of z is independently 1 or 2. The corresponding silicon and/or germanium oxide film may be formed by curing the precursor film (e.g., Group IVA element precursor film) in an oxidizing atmosphere, at a temperature of 300° C., 350° C. or 400° C. or more, but less than the melting temperature of the conductive substrate 100, in the presence of oxygen, ozone, $N_2O$, $NO_2$, or other oxidizing gas, which may be diluted in an inert carrier gas such as nitrogen, argon or helium. In the alternative, other solution-based dielectrics, including spin on glasses, organic dielectrics, etc., may be applied by printing or other conventional coating steps. Such dielectric materials are discussed in detail below with regard to exemplary surveillance/identification devices. In addition, other various techniques for forming the second dielectric layer, and the benefits thereof, are described in U.S. Pat. No. 7,286,053, the relevant portions of which are incorporated herein by reference.

In general, suitable materials for forming the dielectric layer include, but are not limited to, spin on glasses (which may be photodefinable or non-photodefinable, in the latter case patterned by direct printing or post deposition lithography); polyimides (which may be photodefinable and/or thermally sensitized for thermal laser patterning, or non-photodefinable for patterning by direct printing or post deposition lithography); BCB or other organic dielectrics such as SiLK® dielectric material (SILK is a registered trademark of Dow Chemical Co., Midland, Mich.); low-k interlayer dielectrics formed by sol-gel techniques; plasma enhanced (PE) tetraethylorthosilicate (TEOS) (i.e., $SiO_2$ formed by plasma-enhanced CVD of tetraethylorthosilicate); and laminated polymer films such as polyethylene (PE), polyester, or higher temperature polymers such as PES, polyimide or others that are compatible with subsequent high temperature processing. The second dielectric layer may have a thickness of at least one micron, preferably from 2 to 20 μm, more preferably from 5 to 10 μm.

Forming the Electrically Conducting Pattern

Figure 4A:
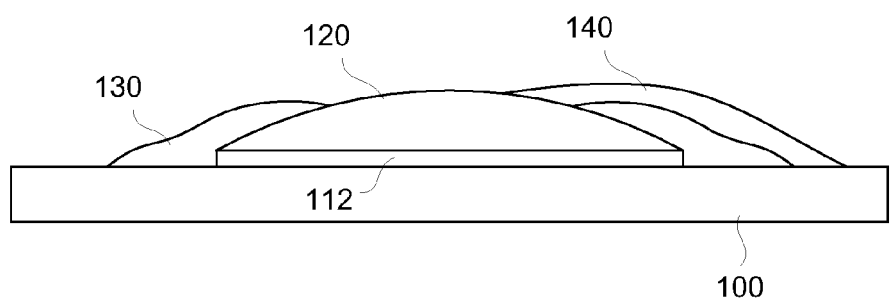
FIGS. 4A and 4B show cross-sectional and top views, respectively, of the structure of FIGS. 3A-3B with an electrically conducting feature on the second dielectric layer.
Figure 4B:
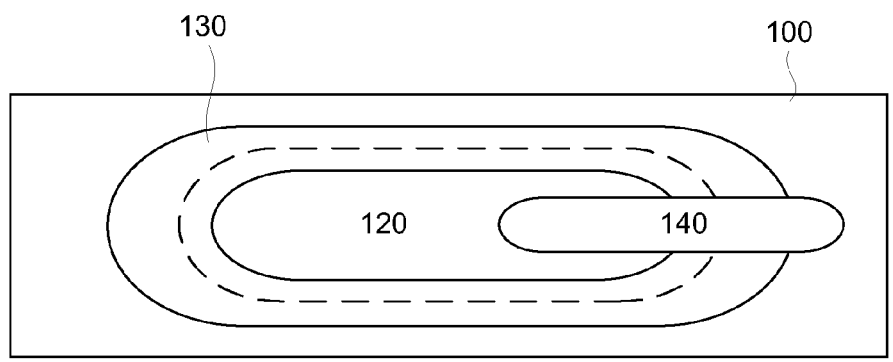
Figure 6A:
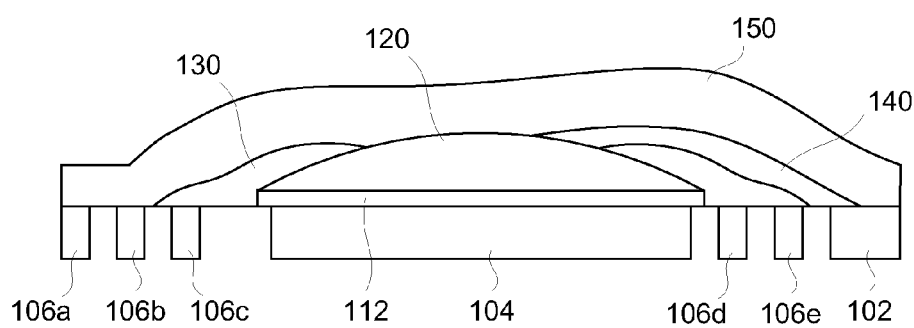
FIG. 6A shows a cross-sectional view of the structure of FIG. 5 with a bottom electrode and an inductor formed from the conductive substrate.
Figure 6B:
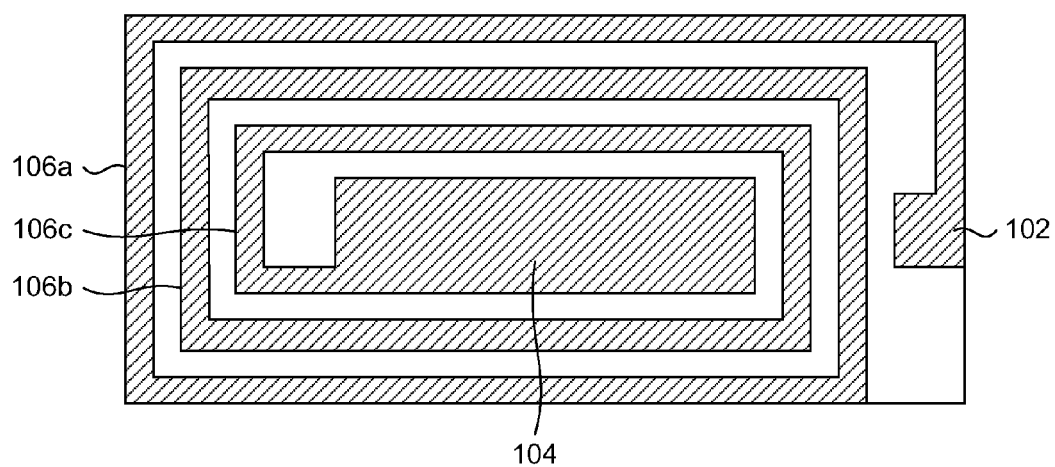
FIG. 6B shows a bottom up view of the structure of FIG. 6A.

Referring now to FIGS. 4A-4B, an electrically conducting feature 140 (e.g., "line," "pattern," and/or "shape") is formed on the second dielectric layer to provide electrical communication between the (semi)conductive layer (top capacitor electrode) and the conductive substrate 100 (from which the surveillance/identification device inductor and bottom capacitor plate can be subsequently formed, as will be seen in FIGS. 6A-6B and discussed below). In general, the electrically conducing feature 140 can be formed by any suitable method known in the art. In exemplary implementations, the feature is formed by printing processes such as inkjet printing, microspotting, stenciling, stamping, syringe dispensing, pump dispensing, screen printing, gravure printing, offset printing, flexography, laser forward transfer, and/or local laser CVD. In such printing processes, the feature may be formed by selectively printing a conductor ink on the second dielectric layer. In other embodiments, forming the feature comprises depositing a conductor material on the dielectric, and then etching the conductor material. In some embodiments, forming the feature may further comprise forming an interconnect pad near the outer coils of the inductor (formed from the conductive substrate as illustrated in FIGS. 6A-6B, and as discussed below) and (semi)conductive layer.

The electrically conducting feature may be formed using various conductive metals. For example, the feature may comprise aluminum, titanium, copper, silver, chromium, molybdenum, tungsten, nickel, gold, palladium, platinum, zinc, iron, stainless steel, or any alloy thereof. In some implementations, the feature may consist essentially silver, gold copper, aluminum, or a conductive alloy thereof. In exemplary embodiments, the feature may be formed using the same material as the conductive substrate and/or the (semi)conductive layer (e.g., the capacitor electrodes). However, the invention is not limited as such, and the feature may comprise different materials than those of the conductive substrate and (semi)conductive layer. In some implementations, dopants, siliciding components, or other work function modulation agents and/or tunneling barrier materials may be included in the feature 140. Such inclusion may reduce the series resistance and increase the Q, and overall performance of the surveillance/identification device.

Passivation

Figure 5:
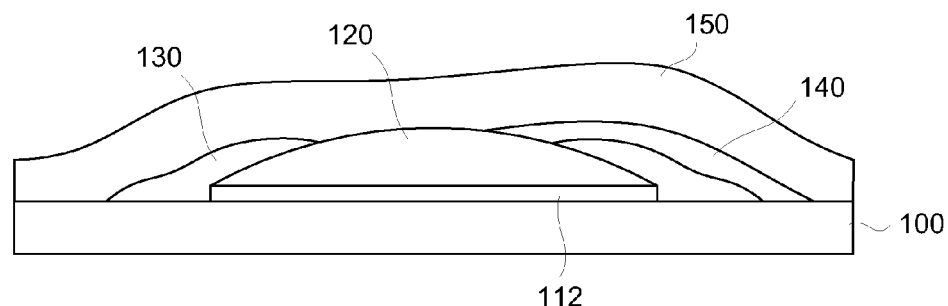
FIG. 5 shows a cross-sectional view of the structure of FIGS. 4A-4B with a passivation layer formed thereon.

As shown in FIG. 5, after forming the electrically conducting feature 140, a passivation layer 150 may optionally be formed over the structure. Such a passivation layer 150 generally adds mechanical support to the surveillance/identification device, particularly during the subsequent processing (e.g., the substrate etching process to form the bottom capacitor electrode and/or the inductor/antenna as discussed below). Furthermore, forming a passivation layer may prevent the ingress of water, oxygen, and/or other species that could cause the degradation or frequency drifting of device performance. The passivation layer 150 may be formed by conventionally coating the upper surface of the structure with one or more inorganic barrier layers such as a polysiloxane and/or a nitride, oxide and/or oxynitride of silicon and/or aluminum, and/or one or more organic barrier layers such as parylene, a fluorinated organic polymer (e.g., as described above), or other barrier material known in the art. Alternatively or additionally, the passivation layer may comprise an underlying dielectric layer. The underlying dielectric layer may be formed from a material having lower stress than that of the overlying passivation layer. To illustrate, the underlying dielectric layer may comprise an oxide (e.g., $SiO_2$, TEOS, undoped silicate glass [USG], fluorosilicate glass [FSG], borophosphosilicate glass [BPSG], etc.), and the passivation layer may comprise silicon nitride or a silicon oxynitride. In some embodiments, the passivation layer may have a thickness that is slightly greater than the thickness of the dielectric layer.

Forming the Inductor and/or Lower Capacitor Plate

FIGS. 6A-6B respectively show cross-sectional and bottom views of a capacitor and/or surveillance/identification device, in which the conductive substrate 100 has been patterned and etched to form a bottom capacitor electrode 104, and an inductor/antenna 106a-106e. In exemplary embodiments, forming the inductor comprises forming an interconnect and/or contact pad 102 to provide an interconnection site for the feature to electrically connect the inductor/antenna 106a-106e to the (semi)conductive layer/top capacitor electrode 120. Thus, the present method further comprises etching the electrically functional substrate, preferably wherein the etching forms an inductor and/or a bottom capacitor electrode (i) capacitively coupled to the (semi)conductive layer 120 (e.g., top capacitor electrode). However, in alternative embodiments, the metal/alloy for capacitor plate 104 and inductor 106a-106e (and, optionally, interconnect pad 102) may be conventionally deposited or printed onto the backside of dielectric film 112.

The substrate 100 (see FIGS. 6A-6B) can be patterned by conventional photolithography, or by contact printing or laser patterning of a resist material applied to the backside (non-device side) of substrate 100. The substrate 100 can then be etched with standard wet (e.g., aqueous acid) or dry (e.g., chlorine, boron trichloride) etches to form the bottom capacitor electrode 104, a plurality of concentric rings or coils (e.g., inductor/antenna 106a-106e), and optionally interconnect and/or contact pad 102. The patterning and/or etching steps may be thermally, optically or electrically assisted. The substrate 100 may also be patterned by direct means such as milling, laser cutting, stamping, or die-cutting.

A backing and/or support layer may be desired or required to provide mechanical stability and/or protection for the non-passivated side of the device 100 during later handling and/or processing. Thus, the present manufacturing method may further comprise the step of adding a support or backing to the etched electrically functional substrate. This backing layer may be added by lamination to paper or a flexible polymeric material (e.g., polyethylene, polypropylene, polyvinyl chloride, polytetrafluoroethylene, a polycarbonate, an electrically insulating polyimide, polystyrene, copolymers thereof, etc.) with the use of heat and/or an adhesive. Where the backing comprises an organic polymer, it is also possible to apply the backing layer from a liquid precursor by dip coating, extrusion coating or other thick film coating technology. In addition to providing mechanical support to the device, a support and/or backing layer may also provide an adhesive surface for subsequent attachment or placement of the surveillance/identification device onto an article to be tracked or monitored.

A second exemplary method for manufacturing the present capacitor and/or surveillance/identification tag/device is described in detail below with reference to FIGS. 7A-11. Some of the steps and/or processes of the second method are the same as or substantially similar to those of the first method described above, and will be referenced as such. Furthermore, embodiments of the first method that are not inconsistent may be applied to the second method as described herein.

Forming the First (Semi)Conductive Layer

Figure 7A:
FIGS. 7A and 7B show cross-sectional and top views, respectively, of a substrate and a first (semi)conductive layer formed thereon, according to another exemplary embodiment of the present invention.
Figure 7B:
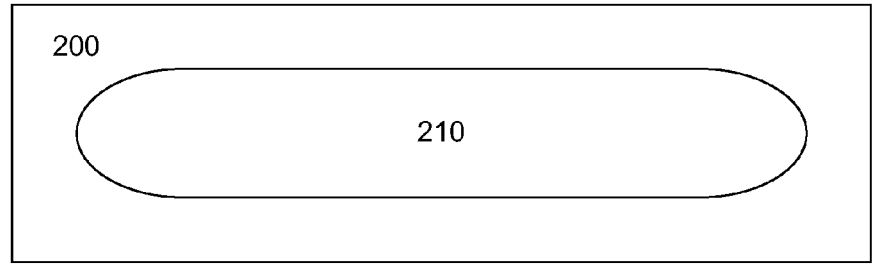

FIGS. 7A-7B respectively show cross-sectional and top-down views of a substrate 200 having a (semi)conductive layer 210 formed thereon. While the (semi)conductive layer 210 may be formed on any type of substrate known in the art, in preferred embodiments, the substrate comprises an insulating and/or otherwise electrically inert material. Various substrates may include, but are not limited to glass (e.g., quartz) sheets, wafers, slips, plastic and/or metal foils or slabs, Si wafers, etc., any of which may include one or more additional layers (e.g., buffer, mechanical support, etc.).

Suitable electrically inert or inactive substrates may comprise a plate, disc, and/or sheet of a glass, ceramic, dielectric and/or plastic. If an electrically conductive substrate is selected as the substrate, it should have an insulator layer between the substrate and any electrically active layer or structure formed thereon. However, the insulator layer is not needed in locations where an electrical contact will be made between the structures and/or devices on the insulator and a structure formed in the conductive substrate. In embodiments requiring an insulator layer, the insulator layer may comprise a spin-on glass barrier layer having a thickness of about 1 µm. In some implementations glass and plastic substrates may further contain a planarization layer thereon to reduce the surface roughness of the substrate. It may be advantageous to form a surface energy modifying layer of a material that improves the adhesion and/or that controls the spreading of a subsequent material (e.g., a printable ink) printed or otherwise deposited thereon, and/or a barrier layer thereon.

In some embodiments, the first (semi)conductive layer (e.g., the bottom capacitor electrode) may be formed by coating, printing, or otherwise depositing a conductor ink (e.g., metal ink or metal precursor ink) on the substrate. Preferably, the first (semi)conductive layer is formed by printing. In alternative embodiments, the first (semi)conductive layer may be formed by plating (e.g., printing and/or laser writing) a seed layer of metal (e.g., Pd) using nanoparticle- and/or compound-based metal ink (e.g., $PdCl_2$-containing ink). A bulk conductor (e.g., Co, Ni, Cu, Pd, etc.) may then be selectively deposited by electroless or electroplating onto the metal seed layer. In addition to the $PdCl_2$-containing ink, metal nanoparticles comprising cobalt, nickel, platinum, palladium, titanium, tungsten or molybdenum (particularly palladium) are preferred for the seed layer. Preferred methods for laser writing and/or laser patterning are described in co-pending U.S. Patent Pub. No. 2008-0048240, published on Feb. 28, 2008, the relevant portions of which are incorporated herein by reference.

In other embodiments, the conductor ink may be blanket deposited by spin-coating an ink containing the metal-containing material onto the substrate, and then curing or annealing the metal, organometallic precursor(s) and/or metal nanoparticles to form the first (semi)conductive layer. In such embodiments, the metal layer formed may be laser patterned to form the desired structure. Exemplary conductive inks/precursor inks are described below with regard to exemplary surveillance/identification devices (see, e.g., forming the bottom and/or top capacitor electrode).

In exemplary embodiments, printing comprises inkjet printing, microspotting, stenciling, stamping, syringe dispensing, pump dispensing, screen printing, gravure printing, offset printing, flexography, laser forward transfer, or local laser CVD. Such techniques for printing a liquid metal and/or precursor ink are described in U.S. Pat. Nos. 7,152,804 and 7,413,513, and in co-pending U.S. patent application Ser. Nos. 10/616,147, 11/203,563, and 12/175,450, filed on Jul. 8, 2003, Aug. 11, 2005, and Jul. 17, 2008 respectively, the relevant portions of which are incorporated herein by reference.

In preferred embodiments, the metal/conductor ink is selectively deposited by inkjet printing. In such embodiments, the conductor ink (e.g., comprising a silane or Group IVA element precursor) may be selectively printed to form a desired pattern, and then subsequently dried and cured (e.g., by heating and/or annealing) for a length of time sufficient to cross-link, oligomerize, and/or polymerize the silane or Group IVA element precursor and/or increase the average molecular weight, increase the viscosity and/or reduce the volatility of the composition. The resulting semiconductor film pattern can be partially or substantially completely crystallized to form a polycrystalline (e.g., polysilicon) film. Techniques for local printing of a liquid semiconductor precursor ink directly onto a substrate (or surface film thereof to form a semiconductor layer are described in co-pending U.S. patent application Ser. Nos. 10/949,013 and 11/203,563, filed on Sep. 24, 2004 and Aug. 11, 2005, respectively, the relevant portions of which are incorporated herein by reference.

In preferred embodiments, the (semi)conductive layer may be formed by printing a conductor (e.g., semiconductor) ink that is lightly or heavily doped (e.g., n-doped silane). Exemplary techniques for printing such inks, and determining and/or controlling the dopant levels in the precursor inks and active films formed from the precursor inks are described in greater detail in co-pending application Ser. Nos. 10/949,013, and 11/867,587 respectively filed on Sep. 24, 2004, and Oct. 4, 2007 the relevant portions of which are incorporated herein by reference.

In various embodiments that use an ink comprising or consisting essentially of a Group IVA element source (e.g., silane and/or nanoparticle-based precursor to Si or doped Si), the step of forming the (semi)conductive layer (e.g., bottom capacitor electrode) may further comprise drying and curing (e.g., heating) the liquid-phase precursor ink after printing.

In some implementations, the conductor (e.g., metal/metal precursor) ink may be dried and cured after the printing step. The drying process may help to remove solvents and/or other additives in the conductor ink formulation. However, some additives may not be completely removed until the conductor ink is heated or annealed under conditions sufficient to substantially completely remove any remaining additives. The curing process is described in co-pending U.S. patent application Ser. No. 10/949,013 filed on Sep. 24, 2004, the relevant portions of which are incorporated herein by reference. When the conductor ink comprises a doped formulation, the curing/heating step may also activate part of the dopant. However, dopant activation may be more likely to occur during a subsequent crystallization step (e.g., by laser irradiation and/or thermal annealing).

Additional formulations and/or methods of forming (semi)conductive layers are discussed above with regard to the first exemplary method. The formulations and techniques described above are generally applicable to forming the first (semi)conductive layer of the second exemplary method to the extent that they are not inconsistent.

Forming the First Dielectric Layer and the Top Capacitor Electrode

Figure 8:
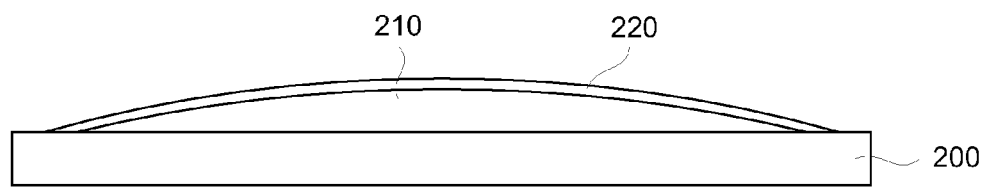
FIG. 8 shows a cross-sectional view of the structure of FIGS. 7A-7B with a first dielectric layer printed thereon.

Referring now to FIG. 8, a first dielectric layer 220 (e.g., capacitor dielectric layer) is formed on the first (semi)conductive layer 210 (e.g., bottom capacitor electrode). The capacitor dielectric layer 220 may be formed using any of the methods and/or techniques described above with regard to the first exemplary method. In preferred embodiments, the first dielectric layer is printed using any of the printing methods described herein.

Figure 9A:
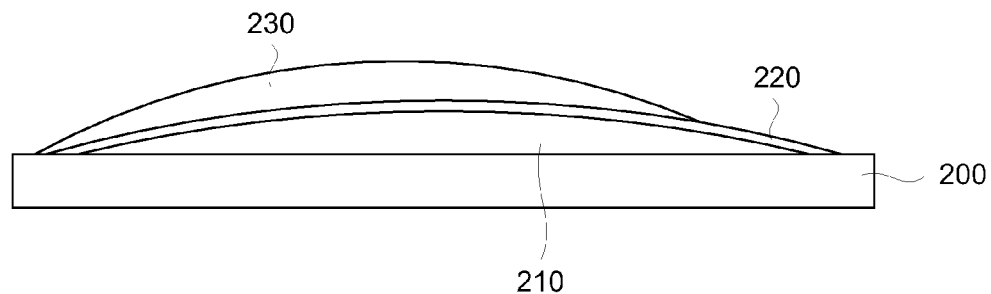
FIGS. 9A and 9B show cross-sectional and top views, respectively, of the structure of FIG. 8 with an upper capacitor plate printed on the first dielectric layer.
Figure 9B:
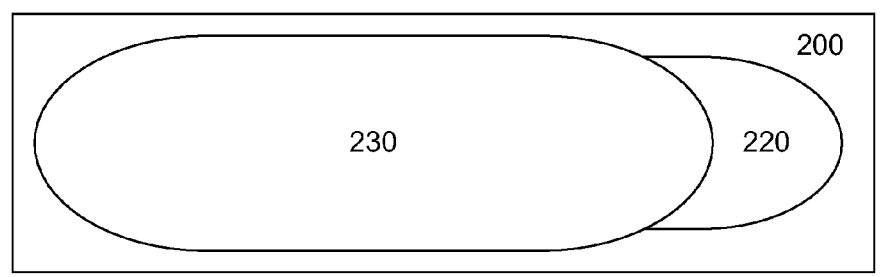

FIGS. 9A-9B show cross-sectional and top-down views respectively of the capacitor after the top capacitor electrode 230 is formed on the first (e.g., capacitor) dielectric layer 220. In general, the top electrode is formed such that a portion of the capacitor dielectric layer 220 remains exposed. The top electrode 230 may be formed using any of the deposition formulations, methods and/or techniques discussed herein with regard to forming (semi)conductive layers and/or structures. In preferred embodiments, the top electrode 230 is selectively printed on the capacitor dielectric 220, or alternatively the top capacitor electrode may be printed/coated and then subsequently etched. The top electrode 230 may be formed from the same conductive material used to form the first (semi)conductive layer 210, or in the alternative, the two (semi)conductive layers (bottom and top capacitor electrodes, 210 and 230 respectively) may be formed from different conductive materials.

Forming the Second Dielectric Layer

Figure 10:
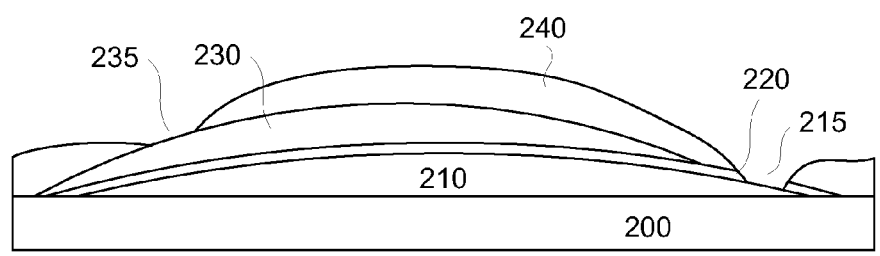
FIG. 10 shows a cross-sectional view of the structure of FIGS. 9A and 9B with a second dielectric layer formed on the upper capacitor plate, the second dielectric layer having first and second contact holes formed therein.

As shown in FIG. 10, a second dielectric layer 240 is formed on the substrate 200. In the second exemplary method, the second dielectric layer 240 has a first contact hole 215 that exposes the first (semi)conductive layer 210, and a second contact hole 235 exposing the top capacitor electrode 230. The second dielectric layer 240 may be formed by blanket deposition techniques, as described herein, and then the contact holes 215/235 formed using etching technique also described herein. In the alternative, the second dielectric layer 240 can be selectively printed using any of the printing techniques described herein such that portions of the first (semi)conductive layer (bottom capacitor electrode) and the top capacitor electrode are exposed. In some embodiments, the second dielectric layer may be selectively printed to include the first and second contact holes therein, and the dielectric layer may be subsequently etched to widen the contact holes as desired.

The second dielectric layer may be doped or undoped. Suitable inks for printing a doped dielectric layer (e.g., 240) include compounds and/or polymers containing dopant and/or dielectric precursor atoms such as phosphorous and oxygen (which may further include silicon, carbon, hydrogen, and/or nitrogen), boron (which may further include silicon, carbon, hydrogen, oxygen, and/or nitrogen), arsenic and/or antimony (either of which may further include silicon, carbon, hydrogen, and/or oxygen, optionally in a suitable solvent (see e.g., U.S. patent application Ser. Nos. 11/818,078, 11/888,949, and 11/888,942, filed on Jun. 12, 2007, Aug. 3, 2007, and Aug. 3, 2007, respectively, the relevant portions of which are incorporated herein by reference. Exemplary dopant-containing dielectric compounds, including examples of precursors for a doped glass dielectric, are described in U.S. patent application Ser. No. 11/842,884, filed on Aug. 21, 2007, the relevant portions of which are incorporated herein by reference.

Forming the Inductor and/or Surveillance/Identification Device

Figure 11:
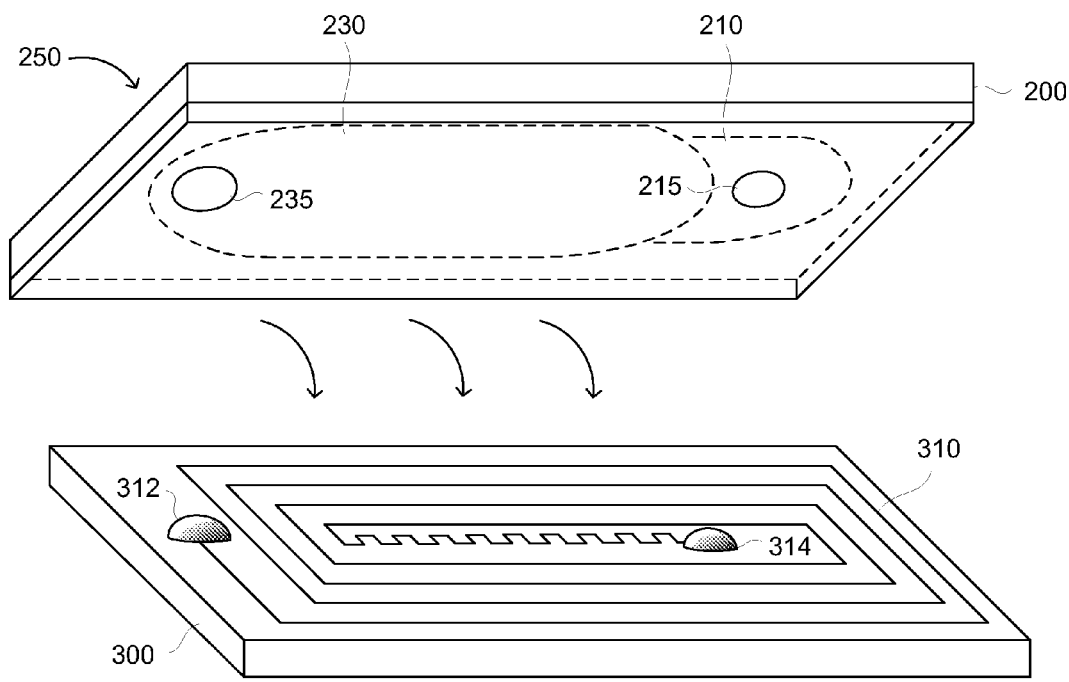
FIG. 11 shows an exemplary method of forming a surveillance and/or identification device according to the present invention by attaching an inductor/antenna to the structure of FIG. 10.

As shown in FIG. 11, the above-described capacitor 250 formed according to the second exemplary method, can be coupled/electrically connected to an inductor and/or antenna 300/310 to form a surveillance and/or identification tag or device. The antenna and/or inductor may comprise the antenna, the inductor, or both. Specifically, a first interconnect/contact pad of the inductor/antenna 312 (the "outer contact pad") electrically contacts the top capacitor electrode 230 where it is exposed by the contact hole 235 in the second dielectric layer. Similarly, a second interconnect/contact pad of the inductor/antenna 314 (the "inner contact pad") electrically contacts the first (semi)conductive layer 210 (e.g., the bottom capacitor electrode) where it is exposed by the contact hole 215 in the second dielectric layer. The interconnect/contact pads 312 and 314 may comprise a metal bump or anisotropic conductive paste (ACP).

The inductor may be formed using methods generally known in the art. For example, the inductor may be formed on a second substrate by blanket deposition, photolithographic masking, and etching and/or cutting processes. Alternatively or additionally, the inductor/antenna may be formed using any of the printing techniques discussed herein. Generally, the antenna and/or inductor comprises a metal. The metal may be one commercially available, such as a foil (e.g., aluminum, stainless steel, copper, or an alloy thereof). The inductor/antenna may be formed on a second substrate 300, and then subsequently attached to the capacitor 250.

The attachment process may include various physical bonding techniques, such as gluing, as well as establishing electrical interconnection(s) via wire bonding, anisotropic conductive epoxy bonding, ultrasonics, bump-bonding or flip-chip approaches. This attachment process often involves the use of heat, time, friction or ultrasonic energy (e.g., between the contact pads of the inductor and the capacitor electrode), and/or UV exposure. Generally, temperatures of less than 200° C. (e.g., less than 150° C., 90-120° C., or any other range of values therein) are required for proper attachment. In alternative embodiments, the capacitor may be printed directly onto the substrate including the inductor and/or antenna (e.g., planar spiral inductor).

In exemplary embodiments, the inductor/antenna is formed as a continuous structure. However, in some embodiments comprising both an antenna and an inductor, the inductor may function as a tuning inductor (see, e.g., U.S. Pat. No. 7,286,053). In such embodiments, the inductor may not be continuous, and instead comprise a first (outer) inductor coupled to one capacitor electrode and a second (inner) inductor coupled to a second capacitor electrode. The present method may further comprise forming a support and/or backing material on a surface of the inductor using methods known in the art, and as discussed herein with regard to the first exemplary method.

It should be noted that many other embodiments would be apparent to one of skill in the art. Thus, the present invention is not limited to the embodiments described herein. For example, the structures may be inverted, formed laterally, etc., rather than using the order of steps disclose above.

Exemplary Surveillance and/or Identification Devices

A second aspect of the invention relates to a surveillance and/or identification devices. A first general embodiment is shown in FIGS. 6A-6B and comprises (a) a unitary conductive structure comprising a bottom capacitor electrode and an inductor, (b) a first dielectric layer on the bottom capacitor electrode and inductor, (c) a top capacitor electrode having a dome-shaped profile on the first dielectric layer, (d) a second dielectric layer on the top capacitor electrode, and the conductive structure, and (e) an electrically conductive feature on the second dielectric layer, one portion of the electrically conducting feature contacting the top capacitor electrode and a second portion of the conducting feature contacting the conductive material. In general, the unitary conductive structure may constitute a conductive substrate on which the semiconductor structures are formed and from which the bottom capacitor electrode and the inductor/antenna are subsequently formed, as described above with regard to the first exemplary method. Optionally, the structure may further comprise a passivation layer on the substrate.

A second general embodiment is shown in FIG. 11, and comprises (a) a bottom capacitor electrode having a dome-shaped profile on a substrate, (b) a first dielectric layer on the bottom capacitor electrode, (c) a top capacitor electrode on the first dielectric layer, (d) a second dielectric layer having a dome-shaped profile on the substrate having first and second contact holes therein exposing the bottom capacitor electrode and the top capacitor electrode, and (e) an antenna and/or inductor having a first end coupled and/or connected to the bottom capacitor electrode and a second end coupled and/or connected to the top capacitor electrode. In the various embodiments described herein, the surveillance and/or identification device preferably comprises an EAS, RF, and/or RFID tag or device.

The Substrate

Generally, the substrate may comprise any suitable substrate known in the art, and depends largely on which of the above-described methods will be used to make the device. For example, the first exemplary device (manufactured according to the first exemplary method, and corresponding to FIGS. 6A-6B) generally comprises a unitary conductive structure/substrate, from which the bottom capacitor electrode 104 and the inductor/antenna 106a-106e can be formed. Preferably, the unitary conductive structure (e.g., substrate) comprises a metal film, metal oil, or metal sheet. Exemplary metal structures/substrates comprise aluminum, titanium, copper, silver, chromium, molybdenum, tungsten, nickel, gold, palladium, platinum, zinc, iron, steel (e.g., stainless), or any alloy thereof. Advantages of unitary conductive material, such as a metal foil are discussed in U.S. Pat. No. 7,286,053.

In various embodiments, other conductive materials may be used including conductive polymers, such as doped polythiophenes, polyimides, polyacetylenes, polycyclobutadienes and polycyclooctatetraenes; conductive inorganic compound films, such as titanium nitride, tantalum nitride, indium tin oxide, etc.; and/or doped semiconductors, such as doped silicon, doped germanium, doped silicon-germanium, doped gallium arsenide, doped (including auto-doped) zinc oxide, zinc sulfide, etc. In various embodiments, the metal/alloy for used for the conductive substrate may comprise a multi-layer structure, such as aluminum, tantalum or zirconium deposited (e.g., by sputtering or CVD) onto a thin copper sheet or foil, or copper deposited (e.g., by electroplating) onto a thin aluminum sheet or foil. However, in preferred embodiments, the conductive substrate comprises or consists essentially of aluminum.

Now referencing the second exemplary device (manufactured according to the second exemplary method, and corresponding to FIG. 11), the substrate may comprise any type of suitable substrate material known in the art (e.g., glass sheets, wafers, slips, plastic, and/or metal foils or slabs, Si wafers, etc). However, in preferred embodiments, the substrate in this exemplary embodiment comprises an insulating and/or otherwise electrically inert material. For example, suitable electrically inert or inactive substrates may comprise a plate, disc, and/or sheet of a glass (e.g., quartz), ceramic, dielectric and/or plastic. In embodiments comprising an electrically conductive substrate (e.g., metal foil, or any of the conductive substrates described herein), the substrate should further comprise an insulator layer between the substrate and electrically active structures subsequently formed thereon. For example, such insulator layers may comprise a spin-on glass barrier layer having a thickness of about 1 μm.

In implementations comprising a glass and/or plastic substrate, the substrate may further comprise a planarization layer thereon to reduce surface roughness of the substrate. In general, the substrate and/or conductive unitary material has a nominal thickness of thickness of from 5 to 200 μm (preferably from 20 to 100 μm) and in the embodiments utilizing a conductive substrate, a resistivity of 0.1-10 μohm-cm (preferably from 0.5 to 5 μohm-cm, and in one embodiment, about 3 μohm-cm).

The Bottom and Top Capacitor Electrodes

In general, the bottom capacitor electrode comprises a first metal and (1) is formed from the conductive substrate, and thus comprises one of the conductive materials discussed above with regard to exemplary conductive substrates (e.g., metal sheet, metal foil, etc.), or (2) is deposited on the substrate, and comprises any suitable conductive material (e.g., metal/conductor ink, metal precursor ink, seed/bulk metal, semiconductor ink, etc.). The top capacitor electrode is printed or otherwise deposited on the dielectric layer, and comprises any suitable conductive material described herein. The top capacitor electrode generally comprises a second metal, which may be the same as the first metal or it may comprise a different metal than the first metal of the bottom capacitor electrode. Preferably, at least one of the capacitor electrodes (e.g., top electrode, bottom electrode, or both) has a dome-shaped profile. Structures having dome-shaped profiles and various methods of forming such structures are described in co-pending U.S. patent application Ser. Nos. 12/114,741 and 12/243,880, respectively filed on May 2, 2008 and Oct. 1, 2008, the relevant portions of which are incorporated herein by reference.

As previously discussed, in some implementations, the bottom capacitor is formed from the conductive substrate (e.g., the conductive unitary material), and may comprise aluminum, titanium, copper, silver, chromium, molybdenum, tungsten, nickel, gold, palladium, platinum, zinc, iron steel, stainless steel, or an alloy thereof. Still, in other implementations, the bottom capacitor layer may comprise conductive polymers, such as doped polythiophenes, polyimides, polyacetylenes, polycyclobutadienes and polycyclooctatetraenes; conductive inorganic compound films, such as titanium nitride, tantalum nitride, indium tin oxide, etc.; and/or doped semiconductors, such as doped silicon, doped germanium, doped silicon-germanium, doped gallium arsenide, doped (including auto-doped) zinc oxide, zinc sulfide, etc. In various embodiments, the metal/alloy for used for the conductive substrate may comprise a multi-layer structure, such as aluminum, tantalum or zirconium deposited (e.g., by sputtering or CVD) onto a thin copper sheet or foil, or copper deposited (e.g., by electroplating) onto a thin aluminum sheet or foil. Preferably, the conductive substrate/unitary material comprises aluminum.

In various implementations a conductor ink is used in the coating and/or printing step to form the bottom and top capacitor electrodes. Such a conductor ink may comprise precursors of elemental metals such as aluminum, titanium, vanadium, chromium, molybdenum, tungsten, iron, nickel, palladium, platinum, copper, zinc, silver, gold, etc. In preferred embodiments, the metal is Pd. Additionally, or alternatively, the conductor ink may comprise a conventional alloy of such elemental metals, such as aluminum-copper alloys, aluminum-silicon alloys, aluminum-copper-silicon alloys, titanium-tungsten alloys, Mo—W alloys, aluminum-titanium alloys, etc. In other implementations, electrically conductive metal compounds, such as the nitrides and silicides of elemental metals (e.g., titanium nitride, titanium silicide, tantalum nitride, cobalt silicide, molybdenum silicide, tungsten silicide, platinum silicide, etc.) may be used in the conductor ink formulation. In other implementations, the metal/conductor ink comprises one or more metal precursors selected from the group consisting of metal nanoparticles, organometallic compounds, and metal salts, in a solvent in which the metal precursor(s) are soluble.

In preferred embodiments, the metal of the conductor ink is able to withstanding high-temperature processing, such as chromium, molybdenum, tungsten, nickel, palladium, platinum, and conventional metal alloys thereof (e.g., aluminum-copper alloys, aluminum-silicon alloys, aluminum-copper-silicon alloys, aluminum-titanium alloys, titanium-tungsten alloys, Mo—W alloys, etc.). Preferably the metal alloy comprises an electrically conductive metal compounds, such as the nitrides and silicides of elemental metals (e.g., titanium nitride, titanium silicide, tantalum nitride, cobalt silicide molybdenum silicide, tungsten silicide, tungsten nitride, tungsten silicon nitride, platinum silicide, etc.). Printable silicide-forming precursor formulations, and methods of forming such printable formulations, are described in co-pending U.S. patent application Ser. No. 12/131,002, filed May 30, 2008, the relevant portions of which are incorporated herein by reference.

In some implementations, the ink precursor for the (semi) conductive layers (e.g., bottom and/or top capacitor electrodes) comprises nanoparticles and/or molecular, oligomeric and/or polymeric compounds of silicon, silicide forming metals, refractory metals, or combinations thereof. Such silicide-forming metals may include Ni, Co, Pd, Pt, Ti, W, and/or Mo, and such refractory metals may include Pd, Mo, and/or W. The nanoparticles or nanocrystals in the ink formulation may be passivated or unpassivated, as described in co-pending U.S. application Ser. Nos. 11/888,949 and 11/888,942, filed Aug. 3, 2007 and Aug. 3, 2007, respectively, the relevant portions of which are incorporated herein by reference.

In some embodiments, the ink formulation may consist essentially of one or more Group 4, 5, 6, 7, 8, 9, 10, 11, or 12 metal salt(s) and/or metal complex(es), one or more solvents adapted to facilitate coating and/or printing of the formulation. Optionally, the formulation may include one or more additives that form gaseous or volatile byproducts upon reduction of the metal salt or metal complex to an elemental metal or alloy thereof. In further embodiments, the ink formulation may further consist essentially of (or the additive may comprise) an anion source, adapted to facilitate dissolution of the metal salt or metal complex in the solvent. In such embodiments, the Group 4, 5, 6, 7, 8, 9, 10, 11, or 12 metal salt comprises a palladium, nickel, cobalt, or platinum salt. The solvent(s) may comprise water, an organic solvent, a mixture of organic solvents, or a mixture of one or more organic solvents and water. However, in further embodiments, the formulation may be substantially anhydrous. In such anhydrous formulations, water (to the extent initially present) is removed or minimized, in which case water is generally not added (although it could be added, if desired, for example to dilute a concentrated ink after manufacturing and/or shipping, but prior to printing). Such ink formulations and methods of forming the same are described in co-pending U.S. patent application Ser. No. 12/131,002, the relevant portions of which are incorporated herein by reference.

In some embodiments, a printed metal layer (e.g., Pd) can serve as a seed layer for electroless deposition or electroplating of other bulk conductive metals and/or forming a metal silicide if so desired. In these embodiments, the ink used to form the seed layer of metal may be a nanoparticle- and/or compound-based metal in such as a $PdCl_2$-containing ink. In other embodiments, the seed layer may comprise metal nanoparticles comprising cobalt, nickel, platinum, palladium, titanium, tungsten or molybdenum. However, in preferred embodiments, the seed layer comprises palladium. The conductive bulk metal in such embodiments may comprise Al, Ag, Au, Cu, Pd, Pt, Ni, Cr, Mo, W, Ru, Rh, and alloys and/or mixtures thereof. Metal inks suitable for forming a seed layer, bulk conductive metals, and methods of forming structures from the same are described in co-pending U.S. application Ser. Nos. 12/131,002 and 12/175,450, filed on May 30, 2008 and Jul. 17, 2008 respectively, the relevant portions of which are incorporated herein by reference.

In exemplary implementations, the conductor ink comprises a semiconductor. In various embodiments, the semiconductor may be either lightly or heavily doped. In the case of silicon or silicon-germanium, the dopant may be selected from the group consisting of boron, phosphorous and arsenic, typically in a conventional concentration (e.g., light or heavy, and/or from $10^{13}$ to $10^{15}$, $10^{15}$ to $10^{17}$, $10^{16}$ to $10^{18}$, $10^{17}$ to $10^{19}$, $10^{19}$ to $10^{21}$ atoms/cm$^2$ or any range of values therein). Suitable semiconductor inks comprise a liquid-phase (poly)- and/or (cyclo)silane. Liquid-phase semiconductor inks may further comprise a semiconductor nanoparticle (such as passivated Si, Ge, or SiGe nanoparticles) and/or a solvent (e.g., cycloalkane). The nanoparticles, or nanocrystals, of such formulations may be conventionally passivated with one or more surfactants or surface ligands such as alkyl, aralkyl, alcohol, alkoxy, mercaptan, alkylthoi, carboxylic acid and/or carboxylate groups). In the alternative, the nanoparticles/nanocrystals may be unpassivated.

In other embodiments, the semiconductor ink may comprise one or more semiconductor compounds (e.g., a (doped) Group IV compound such as SiGe or SiC, III-B compounds such as GaAs, chalcogenide semiconductors such as ZnO and ZnS, organic semiconductors, etc.), and/or one or more semiconductor nanoparticles (e.g., Si, Ge, SiGe, etc.), along with a solvent in which the nanoparticles/compounds are soluble or suspendable (e.g., a $C_6$-$C_{20}$ branched or unbranched alkane that may be substituted with one or more halogens, a $C_6$-$C_{20}$ branched or unbranched alkene, a $C_2$-$C_6$ branched or unbranched alkene substituted with one or more halogens, a $C_5$-$C_{20}$ cycloalkane such as cyclohexane, cyclooctane or decalin, a $C_6$-$C_{10}$ aromatic solvent such as toluene, xylene, tetralin, a di-$C_1$-$C_{10}$ alkyl ether having a total of at least 4 carbon atoms, and/or a $C_4$-$C_{10}$ cyclic alkyl ether such as tetrahydrofuran or dioxane, etc.). The ink formulation may also comprise a surface tension reducing agent, a surfactant, a binder and/or a thickening agent. However, such additives or agents may be omitted. Various exemplary ink formulations, and methods for making such ink formulations are described in co-pending U.S. patent application Ser. Nos. 10/616,147, 10/789,317, 11/452,108, 11/888,949, 11/888,942 and 12/131,002, filed on Jul. 8, 2003, Feb. 27, 2004, Jun. 12, 2006, Aug. 3, 2007, Aug. 3, 2007, and May 30, 2008, respectively, the relevant portions of which are incorporated herein by reference.

In the present surveillance and/or identification device the bottom capacitor electrode may have a nominal thickness of from 5 to 200 µm (preferably from 20 to 100 µm) and/or a resistivity of 0.1-10 µohm-cm (preferably from 0.5 to 5 µohm-cm, and in one embodiment, about 3 µohm-cm). While the bottom capacitor is located substantially in the center of the device electrode (see, e.g., 104 of FIGS. 6A and 210 of FIG. 7A), it may be located in any area of the device, in accordance with design choices and/or preferences. Also, the bottom capacitor electrode (e.g., 104 and/or 210) may have any desired shape, such as round, square, rectangular, triangular, etc., and with nearly any dimensions that allow it to fit in and/or on the surveillance/identification device. Preferably, the bottom capacitor electrode (e.g., 104 and/or 210) has dimensions of (i) width, length and thickness, or (ii) radius and thickness, in which the thickness is substantially less than the other dimension(s). For example, the bottom capacitor electrode (104 and/or 210) may have a radius of from 25 to 10,000 µm (preferably 50 to 5,000 µm, 100 to 2,500 µm, or any range of values therein), or a width and/or length of 50 to 20,000 µm, 100 to 10,000 µm, 250 to 5,000 µm, or any range of values therein.

In some embodiments, the top capacitor electrode 120 may be formed directly above the first dielectric layer 112, such that the top capacitor electrode 120 completely covers the dielectric layer 112, as shown in FIG. 6A. In alternative embodiments, the top capacitor electrode 230 may be formed such that it does not completely cover the first dielectric layer 220, and thus one or more portions of the first dielectric layer 220 are exposed (see, e.g., FIGS. 9A-9B).

As with the bottom capacitor electrode, the top capacitor electrode may also have any desired shape, such as round, square, rectangular, triangular, etc., and with nearly any dimensions that allow it to fit in and/or on the surveillance/ identification device. In preferred embodiments, the top capacitor electrode 120 has a dome-shaped profile. In exemplary embodiments, the top capacitor electrode (e.g., 120 and/or 230) has dimensions of (i) width, length and thickness, or (ii) radius and thickness, in which the thickness is substantially less than the other dimension(s). For example, top capacitor electrode 120 and/or 230 may have a radius of from 20 to 10,000 µm (preferably 40 to 5,000 µm, 80 to 2,500 µm, or any range of values therein), or a width and/or length of 40 to 20,000 µm, 80 to 10,000 µm, 150 to 5,000 µm, or any range of values therein.

The Inductor and/or Antenna

As with the substrate, some of the various characteristics of the inductor and/or antenna depend largely on which of the above-described methods will be used to make the device However, in general, the antenna and/or inductor comprises a metal. The metal may be one commercially available (e.g., a foil comprising aluminum, stainless steel, cooper, or any alloy thereof). In embodiments where the inductor/antenna is formed from the conductive substrate/unitary conductive material, the inductor comprises the same material as the substrate and/or the bottom capacitor plate. However, the inductor/antenna may generally comprise any of the metals described herein. In alternate embodiments, the inductor/ antenna may be printed on the top of the structure (e.g., in a similar fashion as the electrically conductive feature of the first general method).

The inductor/antenna may further comprise one or more contact/interconnect pad regions (see, e.g., 102 of FIGS. 6A and 6B and/or 312/314 of FIG. 11) for connecting the inductor to the capacitor electrodes. The inductor may comprise a continuous structure or it may be discontinuous and comprise a first (outer) inductor coupled to one capacitor electrode and a second (inner) inductor coupled to a second capacitor electrode. In various embodiments, a backing and/or support layer may be attached to the inductor. The support and/or backing layer may provide an adhesive surface for attachment to or placement of the surveillance/identification device to an article to be tracked or monitored.

In some implementations (see, e.g., the embodiments according to FIG. 11), the inductor may comprise the antenna, the inductor, or both. In such embodiments, a first or outer contact pad (e.g., 312 of FIG. 11) of the inductor/antenna electrically contacts the top capacitor electrode 230 where it is exposed by the contact hole 235 formed in the second dielectric layer. Furthermore, a second or inner contact pad (e.g., 314 of FIG. 11) electrically contacts the first (semi)conductive layer/bottom capacitor electrode 210 where it is exposed by the contact hole 215 in the second dielectric layer. In exemplary embodiments, the contact pads 312 and 314 comprise a metal bump or anisotropic conductive paste (ACP). The contact pads of the inductor (e.g., 312 and 314) may be attached and/or affixed to the capacitor electrodes (e.g., 235 and 215) by an adhesive, which may be either conductive or non-conductive.

In exemplary embodiments, the inductor/antenna comprises a coil having a plurality of loops or rings. The inductors shown in FIGS. 6B and 11 have three loops, rings, or coils. However, any suitable number of loops, rings, or coils may be employed, depending on application requirements and design choices/preferences. The inductor may take any form and/or shape conventionally used for such inductors, but preferably it has a coil, or concentric spiral loop, form. For ease of manufacturing and/or device area efficiency, the coil loops generally have a square or rectangular shape, but they may also have a rectangular, octagonal, circular, rounded or oval shape, some other polygonal shape, or any combination thereof, and/or they may have one or more truncated corners, according to application and/or design choices and/or preferences, as long as each successive loop is substantially entirely positioned between the preceding loop and the outermost periphery of the tag/device.

Referring to FIGS. 6A-6B and 11, the concentric loops or rings of the inductor coil (e.g., 106a-106e and/or 310) may have any suitable width and pitch (i.e., inter-ring spacing), and the width and/or pitch may vary from loop to loop or ring to ring. However, in certain embodiments, the wire in each loop (or in each side of each loop or ring) may independently have a width of from 2 to 1000 µm (preferably from 5 to 500 µm, 10 to 200 µm, or any range of values therein) and length of 100 to 50,000 µm, 250 to 25,000 µm, 500 to 20,000 µm, or any range of values therein (as long as the length of the inductor wire does not exceed the dimensions of the EAS device). Alternatively, the radius of each wire loop or ring in the inductor may be from 250 to 25,000 µm (preferably 500 to 20,000 µm). Similarly, the pitch between wires in adjacent concentric loops or rings of the inductor may be from 2 to 1000 µm, 3 to 500 µm, 5 to 250 µm, 10 to 200 µm, or any range of values therein. Furthermore, the width-to-pitch ratio may be from a lower limit of about 1:10, 1:5, 1:3, 1:2 or 1:1, up to an upper limit of about 1:2, 1:1, 2:1, 4:1 or 6:1, or any range of endpoints therein.

Similarly, interconnect pad(s) (e.g., 102 of FIGS. 6A-6B and/or 312/314 of FIG. 11), which is generally configured to provide electrical communication and/or physical contact with bottom and/or top capacitor electrodes (see, e.g., 312/314 of FIG. 11), or in alternate embodiments with the electrically conducting feature (see, e.g., 102 of FIGS. 6A-6B), may have any desired shape, such a round, square, rectangular, triangular, etc. Furthermore, the interconnect/contact pad may have nearly any dimensions that allow it to fit in and/or on the surveillance/identification tag or device, and provide electrical communication and/or physical contact with the capacitor electrodes and/or the electrically conducting feature. Preferably, the interconnect pad(s) (e.g., 102 of FIGS. 6A-6B and 312, 314 of FIG. 11) have dimensions of (i) width, length and thickness, or (ii) radius and thickness, in which the thickness is substantially smaller than the other dimension(s). For example, the interconnect pad may have a radius of from 25 to 2000 µm (preferably 50 to 1000 µm, 100 to 500 µm, or any range of values therein), or a width and/or length of 50 to 5000 µm, 100 to 2000 µm, 200 to 1000 µm, or any range of values therein.

The First and Second Dielectric Layers

The first dielectric layer (e.g., 112 of FIG. 6A and/or 220 of FIG. 10) preferably is designed and made such that application of a deactivating radio frequency electromagnetic field induces a voltage differential in the capacitor across the dielectric layer that will deactivate the tag/device (e.g., a voltage differential of about 4 to about 50 V, preferably about 5 to less than 30 V, more preferably about 10 to 20 V, or any desired range of endpoints therein) through breakdown of the dielectric layer to shorted state or changed capacitance such that the tag circuit no longer resonates at the desired frequency. Thus, in certain embodiments, the first dielectric layer has (i) a thickness of from 50 to 400 Å and/or (ii) a breakdown voltage of from about 10 to about 20 V.

The first and/or second dielectric layer(s) may comprise any electrically insulative dielectric material, such as oxide and/or nitride ceramics or glasses (e.g., silicon dioxide, silicon nitride, silicon oxynitride, aluminum oxide, tantalum oxide, zirconium oxide, etc.), polymers such as polysiloxanes, parylene, polyethylene, polypropylene, undoped polyimides, polycarbonates, polyamides, polyethers, copolymers thereof, fluorinated derivatives thereof, etc. In preferred embodiments, the first dielectric layer (e.g., capacitor dielectric layer) comprises or consists essentially of aluminum oxide and/or a corresponding oxide of the metal used for the bottom capacitor electrode (e.g., 104 of FIG. 6A and/or 210 of FIG. 10).

In some embodiments, the first and/or second dielectric layer may be an inorganic insulator. For example, the dielectric may comprise a metal oxide and/or nitride of the formula $M_xO_yN_z$, wherein M is silicon or a metal selected from the group consisting of aluminum, titanium, zirconium, tantalum, hafnium, vanadium, chromium, molybdenum, tungsten, rhodium, rhenium, iron, ruthenium, copper, zinc, indium, tin, lanthanide metals, actinide, metals, and mixtures thereof. In further embodiments, the inorganic insulator may comprise silicates, aluminates, and/or aluminosilicates of such metals and mixtures, where $y/2+z/3$ equals the combined oxidation state of the x instances of M. In exemplary embodiments, the dielectric comprises a corresponding oxide of the metal used in the conductive substrate and/or the metal of the (semi) conductive layer (e.g., top capacitor electrode).

The second dielectric layer (e.g., 130 of FIG. 3A and/or 240 of FIG. 10) on the top capacitor electrode (e.g., 120 of FIG. 3A and/or 230 of FIG. 10) may have one or more contact holes therein (see, e.g., 135 of FIG. 3A and/or 235 and 215 of FIG. 10). Referring to FIG. 3A, contact hole 130 is formed in the second dielectric layer 130 to expose a portion of the top capacitor electrode 120. This provides electrical contact between the top capacitor electrode 120 and the inductor/antenna via the electrically conducting feature (e.g., 140 of FIG. 4A). Referring now to FIGS. 10-11, a first contact hole 215 is formed in the second dielectric layer 240 to expose the first (semi)conductive layer 210 (e.g., the bottom capacitor electrode), and provide electrical contact with the inductor at interconnect pad 314. A second contact hole 235 is also formed in the second dielectric layer 240 to expose the top capacitor electrode 230, and provide electric contact with the inductor at interconnect pad 312.

The second dielectric layer may be formed from a liquid-phase dielectric precursor ink. The liquid-phase dielectric precursor ink may comprise a compound of the formula $A_nH_y$, where n is from 3 to 12, each A is independently Si or Ge, and y is an even integer of from n to 2n+2, and preferably a compound of the formula $(AH_z)_n$, where n is from 5 to 10, each A is independently Si or Ge, and each of the n instances of z is independently 1 or 2. A corresponding silicon and/or germanium oxide film may be formed by curing the precursor film as previously described (e.g., Group IVA element precursor film).

In exemplary embodiments, the second dielectric layer may comprise spin on glasses (which may be photodefinable or non-photodefinable, in the latter case patterned by direct printing or post deposition lithography); polyimides (which may be photodefinable and/or thermally sensitized for thermal laser patterning, or non-photodefinable for patterning by direct printing or post deposition lithography); BCB or other organic dielectrics such as SiLK® dielectric material (SILK is a registered trademark of Dow Chemical Co., Midland, Mich.); low-k interlayer dielectrics formed by sol-gel techniques; plasma enhanced (PE) TEOS (i.e., $SiO_2$ formed by plasma-enhanced CVD of tetraethylorthosilicate); and laminated polymer films such as polyethylene (PE), polyester, or higher temperature polymers such as PES, polyimide or others that are compatible with subsequent high temperature processing.

In preferred embodiments, the second dielectric layer comprises an oxide and/or nitride of a Group IVA element, which may further contain conventional boron and/or phosphorous oxide modifiers in conventional amounts. Thus, the Group IVA element may comprise or consist essentially of silicon, in which case the second dielectric layer (e.g., 130 in FIG. 3A and/or 240 in FIG. 10) may comprise or consist essentially of silicon dioxide, silicon nitride, silicon oxynitride, a borosilicate glass, a phosphosilicate glass, or a borophosphosilicate glass (preferably silicon dioxide). The second dielectric layer may have a thickness of at least 1 μm, preferably from 2 to 25 μm, more preferably from 5 to 10 μm.

The Electrically Conducting Feature

The first exemplary device (see, e.g., FIGS. 1A-6B) comprises an electrically conducting feature 140 to provide electrical communication between the capacitor (e.g., top capacitor electrode) 120 and the inductor 106a-106e. The feature may be connected to the capacitor electrodes and the inductor using either conductive or non-conductive adhesive. The feature may have one or more interconnect/contact pads (e.g., a pad portion) for connecting to the capacitor electrode 120 and/or the inductor coils 106a-106e/contact pad 102. The feature may have any suitable shape (e.g., square, rectangular, round, etc.). In various embodiments, the feature has a thickness of from 30 nm to 5000 nm, preferably from 50 nm to 2000 nm, more preferably from 80 nm to 500 nm.

The feature may comprise any electrically conductive material. However, in exemplary embodiments, the feature 140 comprises a second metal, which may be selected from the same materials and/or metals described above for the first (semi)conductive layer (e.g., bottom capacitor electrode) and/or the inductor as discussed herein. For example, in preferred embodiments, the feature comprises aluminum, titanium, copper, silver, chromium, molybdenum, tungsten, nickel, gold, palladium, platinum, zinc, iron, stainless steel, or any alloy thereof. In exemplary embodiments, the feature consists essentially of silver, gold, copper or aluminum (or a conductive alloy thereof). In various implementations the feature and the capacitor electrodes comprise the same material. However, the invention is not limited as such. Thus, in an alternate embodiment, the feature and the capacitor electrodes comprise different materials. In some implementations, dopants, siliciding components, or other work function modulation agents and/or tunneling barrier materials may be included in the feature 140. Such inclusion may reduce the series resistance and increase the Q, and overall performance of the surveillance and/or identification device.

Passivation Layer

In some embodiments, the present device may further comprise a passivation layer (see, e.g., structure 150 of FIG. 6A) over the structure, including but not limited to the electrically conducting feature 140, and the top capacitor electrode 120. The passivation layer may inhibit or prevent the ingress of water, oxygen, and/or other species that might cause degradation or failure of the integrated circuitry/device. Furthermore the passivation layer may provide some mechanical support to the device, particularly during subsequent processing steps. The passivation layer is generally conventional, and may comprise an organic polymer, such as parylene, polyethylene, polypropylene, a polyimide, copolymers thereof, a fluorinated organic polymer, or any other barrier material. In other embodiments, the passivation layer may comprise an inorganic dielectric, such as aluminum oxide, silicon dioxide (e.g., which may be conventionally doped and/or which may comprise a spin-on-glass, silicon nitride, silicon oxynitride, polysiloxane, or a combination thereof, as a mixture or a multilayer structure).

In the alternative, the passivation layer may further comprise an underlying dielectric layer, which may comprise a material having lower stress than the overlying passivation layer. For example, the dielectric layer may comprise an oxide, such as $SiO_2$ (e.g., TEOS, USG, FSG, BPSG, etc.), and the passivation layer may comprise silicon nitride or a silicon oxynitride. In such embodiments, the passivation layer may have a thickness slightly greater than that of the underlying dielectric layer.

In exemplary embodiments, the passivation layer generally has the same width and length dimensions as the surveillance/identification device. It may also have any thickness suitable for such a surveillance/identification tag or device. For example, the passivation layer 150 may have a thickness of from 3 to 100 μm, from 5 to 50 μm, 10 to 25 μm, or any range of values therein.

The present device may also further comprise a support and/or backing layer (not shown) on a surface of the inductor (see, e.g., 106a-106e of FIG. 6B and/or 310 of FIG. 11). The support and/or backing layer are conventional, and are well known in the surveillance/identification device arts (see, e.g., U.S. Pat. Appl. Publication No. 2002/0163434 and U.S. Pat. Nos. 5,841,350, 5,608,379 and 4,063,229, the relevant portions of each of which are incorporated herein by reference). Generally, such support and/or backing layers provide (1) an adhesive surface for subsequent attachment or placement onto an article to be tracked or monitored, and/or (2) some mechanical support for the surveillance/identification device itself. For example, the present tag/device may be affixed to the back of a price or article identification label, and an adhesive coated or placed on the opposite surface of the tag (optionally covered by a conventional release sheet until the tag is ready for use), to form a price or article identification label suitable for use in a conventional surveillance/identification tag/device system.

Exemplary Methods of Detecting Items Using the Present Surveillance and/or Identification Tags/Devices The present invention further relates to method of detecting an item or object in a detection zone comprising the steps of: (a) causing or inducing a current in the present device sufficient for the device to radiate detectable electromagnetic radiation (preferably at a frequency that is an integer multiple or an integer divisor of an applied electromagnetic field), (b) detecting the detectable electromagnetic radiation, and optionally, (c) selectively deactivating the device and/or causing the device to take action. Generally, currents and voltages are induced in the present device sufficient for the device to radiate detectable electromagnetic radiation when the device is in a detection zone comprising an oscillating electromagnetic field. This oscillating electromagnetic field is produced or generated by conventional surveillance/identification detection equipment and/or systems.

The present method of use may further comprise attaching, affixing or otherwise including the present device on or in an object or article to be detected. Furthermore, in accordance with an advantage of the present device, it may be deactivated by non-volatile shifting of the thresholds (i.e., position of the CV curve features versus voltage) or capacitance of the device in response to an applied electromagnetic field having sufficient strength and an effective oscillating frequency to induce a current, voltage and/or resonance in the device.

on the particular type of system in use, the type and size of the article, etc. In general, such systems are employed for detecting the presence or absence of an active security tag as the security tag and the protected article to which it is affixed pass through a security or surveillance zone or pass by or near a security checkpoint or surveillance station. However, the present invention is not limited to security. For example, the present surveillance/identification devices may further comprise logic, which causes the device to perform an action upon detection in the detection zone.

The present tags are designed at least in part to work with electronic security systems that sense disturbances in radio frequency (RF) electromagnetic fields. Such electronic security systems generally establish an electromagnetic field in a controlled area defined by portals through which articles must pass in leaving the controlled premises (e.g., a retail store). A tag/device having a resonant circuit is attached to each article, and the presence of the tag circuit in the controlled area is sensed by a receiving system to denote the unauthorized removal of an article. The tag circuit may deactivated, detuned or removed by authorized personnel from any article authorized to leave the premises to permit passage of the article through the controlled area equipped with alarm activation. Most of the tags that operate on this principle are single-use or disposable tags, and are therefore designed to be produced at low cost in very large volumes.

The present tags may be used (and, if desired and/or applicable, re-used) in any commercial EAS, RF, and/or RFID application and in essentially any frequency range for such applications. For example, the present tags may be used at the frequencies, and in the fields and/or ranges, described in the Table below:

TABLE 1

Exemplary applications.

| Frequencies | Preferred Frequencies | Range/Field of Detection/ Response | Preferred Range/Field of Detection/ Response | Exemplary Commercial Application(s) |
|---|---|---|---|---|
| 100-150 KHz | 125-134 KHz | up to 10 feet | up to 5 feet | animal ID, car anti-theft systems, beer keg tracking |
| about 8.2 MHz | 8.2 MHz | up to 10 feet | up to 5 feet | inventory tracking (e.g., libraries, apparel, auto/ motorcycle parts), building security/access |
| about 13.56 MHz | 13.56 MHz | up to 10 feet | up to 5 feet | inventory tracking (e.g., libraries, apparel, auto/ motorcycle parts), building security/access |
| 800-1000 MHz | 868-928 MHz | up to 30 feet | up to 18 feet | pallet and shipping container tracking, shipyard container tracking |
| 2.4-2.5 GHz | about 2.45 GHz | up to 30 feet | up to 20 feet | auto toll tags |

Typically, the device is deactivated when the presence of the object or article in the detection zone is not to be detected or otherwise known.

The use of electronic article surveillance, security and/or identification systems for detecting and/or preventing theft or unauthorized removal of articles or goods from retail establishments and/or other facilities, such as libraries, has become widespread. In general, surveillance/identification device systems employ a label or security tag, also known as an EAS, RF, and/or RFID tag, which is affixed to, associated with, or otherwise secured to an article or item to be detected (e.g., protected) or its packaging. Surveillance/identification tags may have many different sizes, shapes and forms, depending Deactivation methods generally incorporate remote electronic deactivation of a resonant tag circuit such that the deactivated tag can remain on an article properly leaving the premises. Examples of such deactivation systems are described in U.S. Pat. Nos. 4,728,938 and 5,081,445, the relevant portions of each of which are incorporated herein by reference. Electronic deactivation of a resonant security/identification tag involves changing or destroying the detection frequency resonance so that the security tag is no longer detected as an active security tag by the security system. There are many methods available for achieving electronic deactivation. In general, however, the known methods involve either short circuiting a portion of the resonant circuit or creating an open circuit within some portion of the resonant circuit to either spoil the Q of the circuit or shift the resonant frequency out of the frequency range of the detection system, or both.

At energy levels that are typically higher than the detecting signal, but generally within FCC regulations, the deactivation apparatus induces a voltage in the resonant circuit of the tag 100 sufficient to cause the dielectric film 20 between the lower capacitor plate 10a and semiconductor component 30 to break down. Thus, the present surveillance/identification device(s) described herein can be conveniently deactivated at a checkout counter or other similar location by momentarily placing the tag above or near the deactivation apparatus.

The present invention thus also pertains to article surveillance techniques wherein electromagnetic waves are transmitted into an area of the premises being protected at a fundamental frequency (e.g., 13.56 MHz), and the unauthorized presence of articles in the area is sensed by reception and detection of electromagnetic radiation emitted by the present surveillance/identification device(s). This emitted electromagnetic radiation may comprise second harmonic or subsequent harmonic frequency waves reradiated from sensor-emitter elements, labels, or films comprising the present EAS device that have been attached to or embedded in the articles, under circumstances in which the labels or films have not been deactivated for authorized removal from the premises.

A method of article surveillance, theft detection, or other methods of identification according to aspects of the present invention may be understood with the following description of the sequential steps utilized. The present surveillance/identification tag (for example, formed integrally with a price label) is attached to or embedded in an item, article or object that may be under system surveillance. Next, any active tags/devices on articles that have been paid for or otherwise authorized for removal from the surveillance area may be deactivated or desensitized by a deactivation apparatus operator (e.g., a checkout clerk or guard) monitoring the premises. Thereafter, harmonic frequency emissions or re-radiation signals or electromagnetic waves or energy from devices/tags that have not been deactivated or desensitized are detected as they are moved through a detection zone (e.g., an exit or verification area) in which a fundamental frequency electromagnetic wave or electrical space energy field is present. The detection of harmonic signals in this area signifies the unauthorized presence or attempted removal of unverified articles with active devices/tags thereon, and may be used to signal or trigger an alarm or to lock exit doors or turnstiles. While the detection of tag signals at a frequency of 2× or ½ the carrier or reader transmit frequency represents a preferred form of the method of use, other harmonic signals, such as third and subsequent harmonic signals, as well as fundamental and other subharmonic signals, may be employed.

CONCLUSION/SUMMARY

Thus, the present invention provides methods of making a capacitor, surveillance and/or identification devices, and methods for the manufacture and use of such devices. A first general method of making a capacitor according to the methods of the present invention comprises (a) forming a first dielectric layer on a conductive substrate, (b) printing a (semi)conductive layer on at least a portion of the first dielectric, (c) etching the dielectric layer using the (semi)conductive layer as a mask, (d) forming a second dielectric layer in a pattern on the conductive substrate and/or the (semi)conductive layer, (e) forming an electrically conducting feature on the second dielectric layer, one portion of the electrically conducting feature contacting the (semi)conductive layer and a second portion of the conducting feature contacting the conductive substrate, and (f) forming a bottom electrode from the conductive substrate. A surveillance and/or an identification device may be subsequently formed by also forming an inductor from the conductive substrate.

A second general method of making a capacitor comprises (a) printing a first (semi)conductive layer including a bottom capacitor electrode on a substrate, (b) forming a first dielectric layer in a pattern on the first (semi)conductive layer, (c) printing an upper capacitor plate on the first dielectric layer, and (d) forming a second dielectric layer on the substrate, the second dielectric layer having a first contact hole therein exposing the first (semi)conductive layer and a second contact hole exposing the upper capacitor plate. A surveillance and/or identification device may be formed from the capacitor by coupling and/or otherwise connecting an antenna and/or inductor to the first (semi)conductive layer and the upper capacitor plate.

A first surveillance and/or identification device of the present invention generally comprises (a) a unitary conductive structure comprising a bottom capacitor electrode and an inductor, (b) a first dielectric layer on the bottom capacitor electrode and inductor, (c) a top capacitor electrode having a dome-shaped profile on the first dielectric layer, (d) a second dielectric layer on the top capacitor electrode, and the conductive structure, and (e) an electrically conducting feature on the second dielectric layer, one portion of the electrically conducting feature contacting the top capacitor electrode and a second portion of the conducting feature contacting the conductive material.

A second surveillance and/or identification device of the present invention generally comprises (a) a bottom capacitor electrode having a dome-shaped profile on a substrate, (b) a first dielectric layer on the bottom capacitor layer, (c) a top capacitor electrode having a dome-shaped profile on the first dielectric layer, (d) a second dielectric layer on the substrate having first and second contact holes therein exposing the bottom capacitor electrode and the top capacitor electrode, and (e) an antenna and/or inductor having a first end coupled and/or connected to the bottom capacitor electrode, and a second end coupled and/or connected to the top capacitor electrode.

The method for detecting items with a surveillance and/or identification device of the present invention generally comprises the steps of (1) causing or inducing a current sufficient for the device to re-radiate and/or backscatter detectable electromagnetic radiation, and (2) detecting the detectable electromagnetic radiation. Optionally, a detected surveillance and/or identification device may be selectively deactivated. Additionally or alternatively, the method may include causing a device to take an action when the electromagnetic radiation is detected.

The methods and/or devices of the present invention may improve surveillance/identification device reliability by (1) improving manufacturing tolerances, (2) ensuring more reliable dielectric rupture for tag deactivation, and (3) substantially reducing accidental healing or repair of the dielectric after deactivation, thus preventing unintended reactivation of the surveillance/identification device.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of making a capacitor, comprising:
   a) printing a first (semi)conductive layer including a bottom capacitor electrode on a substrate, wherein the first (semi)conductive layer comprises a first elemental metal, a first alloy of elemental metals, a first conductive inorganic compound, or a first Group IV, Group III-V, or chalcogenide semiconductor;
   b) forming an inorganic capacitor dielectric layer in a pattern on the first (semi)conductive layer;
   c) printing a top capacitor electrode on the inorganic capacitor dielectric layer, leaving a portion of the inorganic capacitor dielectric layer exposed, wherein the top capacitor electrode comprises a second elemental metal, a second alloy of elemental metals, a second conductive inorganic compound, or a second Group IV, Group III-V, or chalcogenide semiconductor; and
   d) forming a second dielectric layer on the top capacitor electrode, the exposed inorganic capacitor dielectric layer, and the substrate, the second dielectric layer having (i) a first contact hole therein, exposing at least part of the exposed portion of the inorganic capacitor dielectric layer or the first (semi)conductive layer under the exposed portion of the inorganic capacitor dielectric layer, and (ii) a second contact hole exposing the top capacitor electrode, wherein the second dielectric layer does not contact the first (semi)conductive layer.

2. The method of claim 1, wherein the substrate comprises an electrically inert substrate.

3. The method of claim 1, wherein printing at least the first (semi)conductive layer comprises printing a seed layer of metal using a nanoparticle and/or compound-based metal ink and electroplating a conductor metal on the metal seed layer.

4. The method of claim 1, wherein printing the top and bottom capacitor electrodes comprises inkjet printing, gravure printing, screen printing, offset printing, flexography, syringe dispensing, microspotting, stenciling, stamping, pump dispensing, laser forward transfer, local laser CVD, or pen-coating a conductive or semiconductive precursor ink on the substrate and/or first dielectric layer.

5. The method of claim 1, wherein printing the first (semi)conductive layer comprises selectively printing a silane or Group IVA element precursor ink to form a desired pattern, and then drying and curing the silane or Group IVA element precursor ink for a length of time sufficient to cross-link, oligomerize, and/or polymerize the silane or Group IVA element precursor.

6. The method of claim 5, wherein printing the first (semi)conductive layer comprises printing a doped liquid-phase semiconductor ink, and subsequently drying and curing the liquid-phase ink.

7. The method of claim 1, wherein forming the first dielectric layer comprises inkjet printing, gravure printing, screen printing, offset printing, flexography, syringe dispensing, microspotting, stenciling, stamping, pump dispensing, laser forward transfer, local laser CVD, or pen-coating a liquid-phase dielectric precursor ink on the first (semi)conductive layer.

8. The method of claim 1, wherein forming the second dielectric layer comprises blanket deposition of a dielectric material and etching the dielectric material to form the first and second contact holes therein.

9. The method of claim 1, wherein forming the second dielectric layer comprises printing a dielectric precursor material such that the first and second contact holes are formed therein.

10. The method of claim 9, further comprising etching the second dielectric layer to widen the first and second contact holes.

11. A method of making a surveillance and/or an identification device comprising:
   a) the method of claim 1; and
   b) attaching an antenna and/or inductor to the first (semi)conductive layer and the top capacitor electrode.

12. The method of claim 11, further comprising forming the antenna and/or inductor on a second substrate, and subsequently attaching the first and second substrates.

13. The method of claim 11, wherein attaching the antenna/inductor comprises gluing, wire bonding, anisotropic conductive epoxy bonding, ultrasonics, bump-bonding, or flip-chip bonding.

14. The method of claim 12, wherein the antenna and/or inductor is formed as a continuous structure.

15. The method of claim 2, wherein the substrate comprises a dielectric.

16. The method of claim 2, wherein the substrate comprises glass, a ceramic, and/or a plastic.

17. The method of claim 1, wherein the first (semi)conductive layer comprises a first elemental metal or a first alloy of elemental metals.

18. The method of claim 17, wherein the first (semi)conductive layer consists essentially of Al, Ag, Au, Cu, Pd, Pt, Ni, Cr, Mo, W, Ru, Rh, or an alloy thereof.

19. The method of claim 1, wherein the first (semi)conductive layer comprises a first Group IV semiconductor.

20. The method of claim 17, wherein the top capacitor electrode comprises a first elemental metal or a first alloy of elemental metals.

21. The method of claim 20, wherein the top capacitor electrode consists essentially of Al, Ag, Au, Cu, Pd, Pt, Ni, Cr, Mo, W, Ru, Rh, or an alloy thereof.

22. The method of claim 19, wherein the top capacitor electrode comprises a second Group IV semiconductor.

23. The method of claim 4, wherein printing the top and bottom capacitor electrodes comprises inkjet printing, gravure printing, or screen printing the conductive or semiconductive precursor ink.

24. The method of claim 7, wherein forming the first dielectric layer comprises inkjet printing or screen printing.

25. The method of claim 1, wherein forming the second dielectric layer comprises inkjet printing or screen printing.

26. The method of claim 1, wherein the inorganic capacitor dielectric layer comprises an oxide or nitride of silicon, aluminum, chromium, or hafnium.

27. The method of claim 11, wherein the antenna/inductor comprises aluminum, stainless steel, copper, or an alloy thereof.

28. The method of claim 13, wherein attaching the antenna/inductor comprises gluing, anisotropic conductive epoxy bonding, or flip-chip bonding.

29. The method of claim 28, wherein attaching the antenna/inductor comprises gluing or anisotropic conductive epoxy bonding.

30. The method of claim 1, wherein the inorganic capacitor dielectric layer is formed over an entire surface of the first (semi)conductive layer.

* * * * *